(12) United States Patent
Barcelou

(10) Patent No.: US 7,699,220 B2
(45) Date of Patent: *Apr. 20, 2010

(54) AUTOMATED TRANSACTION MACHINE

(75) Inventor: David M. Barcelou, Rydal, PA (US)

(73) Assignee: Transaction Holdings Ltd., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/982,243

(22) Filed: Oct. 31, 2007

(65) Prior Publication Data

US 2008/0067239 A1 Mar. 20, 2008

Related U.S. Application Data

(63) Continuation of application No. 11/818,217, filed on Jun. 13, 2007, now abandoned, which is a continuation of application No. 11/123,982, filed on May 6, 2005, now abandoned, which is a continuation of application No. 09/180,558, filed as application No. PCT/US97/08089 on May 9, 1997, now Pat. No. 6,945,457.

(60) Provisional application No. 60/017,533, filed on May 10, 1996.

(51) Int. Cl.
*G06K 5/00* (2006.01)
*G07D 11/00* (2006.01)
*G07F 19/00* (2006.01)

(52) U.S. Cl. ........................ 235/380; 235/379

(58) Field of Classification Search .............. 235/380, 235/379, 382, 381; 705/43, 40
See application file for complete search history.

(56) References Cited

U.S. PATENT DOCUMENTS

| | | | |
|---|---|---|---|
| 3,397,763 | A | 8/1968 | Wahlberg |
| 3,705,384 | A | 12/1972 | Wahlberg |
| 3,798,603 | A | 3/1974 | Wahlberg |
| 3,826,344 | A | 7/1974 | Wahlberg |
| 3,937,925 | A | 2/1976 | Boothroyd |
| 3,957,173 | A | 5/1976 | Roudebush |
| 3,970,992 | A | 7/1976 | Boothroyd et al. |
| 3,971,916 | A | 7/1976 | Moreno |
| 4,007,355 | A | 2/1977 | Moreno |
| 4,050,562 | A | 9/1977 | Schwippert et al. |
| 4,092,524 | A | 5/1978 | Moreno |
| 4,102,493 | A | 7/1978 | Moreno |

(Continued)

OTHER PUBLICATIONS

Office Action mailed May 15, 2008 for U.S. Appl. No. 11/981,993 to D. Barcelou.

(Continued)

*Primary Examiner*—Thien M Le
(74) *Attorney, Agent, or Firm*—Troutman Sanders LLP; Albert L. Jacobs; Gerard F. Diebner

(57) ABSTRACT

An automated retail terminal in which a plurality of goods and/or services are provided in an integrated system. The integrated system generally avoids duplicating hardware or functions in the course of delivering the goods or services offered, so for example in a combination ATM and Internet kiosk the same credit card or smart card reader is used for both the ATM and the Internet kiosk functions, the same control screen activates the ATM functions and the Internet functions, and etc.

88 Claims, 9 Drawing Sheets

U.S. PATENT DOCUMENTS

| | | |
|---|---|---|
| 4,105,156 A | 8/1978 | Dethloff |
| 4,166,945 A | 9/1979 | Inoyama et al. |
| 4,179,723 A | 12/1979 | Spencer |
| 4,190,066 A | 2/1980 | Burnside |
| 4,197,986 A | 4/1980 | Nagata |
| 4,211,919 A | 7/1980 | Ugon |
| 4,225,779 A | 9/1980 | Sano et al. |
| 4,253,016 A | 2/1981 | Hirose |
| RE30,773 E | 10/1981 | Glaser et al. |
| 4,295,041 A | 10/1981 | Ugon |
| 4,305,059 A | 12/1981 | Benton |
| 4,319,336 A | 3/1982 | Anderson et al. |
| 4,341,951 A | 7/1982 | Benton |
| 4,343,582 A | 8/1982 | Lundblad et al. |
| 4,365,700 A | 12/1982 | Arimoto et al. |
| 4,382,279 A | 5/1983 | Ugon |
| 4,454,414 A | 6/1984 | Benton |
| 4,454,670 A | 6/1984 | Bachmann et al. |
| 4,497,261 A | 2/1985 | Ferris et al. |
| 4,521,008 A | 6/1985 | Granzow et al. |
| 4,528,643 A | 7/1985 | Freeny, Jr. |
| 4,529,870 A | 7/1985 | Chaum |
| 4,538,058 A | 8/1985 | Ugon |
| 4,541,057 A | 9/1985 | Hagiwara |
| 4,544,833 A | 10/1985 | Ugon |
| 4,567,359 A | 1/1986 | Lockwood |
| RE32,115 E | 4/1986 | Lockwood |
| 4,593,183 A | 6/1986 | Fukatsu |
| 4,605,844 A | 8/1986 | Haggan |
| 4,625,276 A | 11/1986 | Benton |
| 4,630,201 A | 12/1986 | White |
| 4,639,582 A | 1/1987 | Arikawa et al. |
| 4,650,977 A | 3/1987 | Couch |
| 4,656,342 A | 4/1987 | Ugon |
| D291,379 S | 8/1987 | Gengler et al. |
| 4,706,081 A | 11/1987 | Hart et al. |
| 4,726,474 A | 2/1988 | Arikawa et al. |
| 4,733,765 A | 3/1988 | Watanabe |
| 4,736,094 A | 4/1988 | Yoshida |
| 4,757,185 A | 7/1988 | Onishi |
| 4,759,063 A | 7/1988 | Chaum |
| 4,759,064 A | 7/1988 | Chaum |
| 4,766,293 A | 8/1988 | Boston |
| 4,803,347 A | 2/1989 | Sugahara et al. |
| 4,804,830 A | 2/1989 | Miyagisima et al. |
| 4,815,741 A | 3/1989 | Small |
| 4,831,245 A | 5/1989 | Osasawara |
| 4,833,607 A | 5/1989 | Dethloff |
| 4,837,422 A | 6/1989 | Dethloff et al. |
| 4,853,522 A | 8/1989 | Osasawara |
| 4,868,376 A | 9/1989 | Lessin et al. |
| 4,869,500 A | 9/1989 | Williams |
| 4,874,935 A | 10/1989 | Younger |
| 4,914,698 A | 4/1990 | Chaum |
| 4,926,480 A | 5/1990 | Chaum |
| 4,947,430 A | 8/1990 | Chaum |
| 4,949,380 A | 8/1990 | Chaum |
| 4,953,086 A | 8/1990 | Fukatsu |
| 4,961,142 A | 10/1990 | Elliott et al. |
| 4,962,866 A | 10/1990 | Phillips |
| 4,970,655 A | 11/1990 | Winn |
| 4,974,170 A | 11/1990 | Bouve et al. |
| 4,977,595 A | 12/1990 | Ohta et al. |
| 4,991,210 A | 2/1991 | Chaum |
| 4,996,711 A | 2/1991 | Chaum |
| 5,025,373 A | 6/1991 | Keyser, Jr. et al. |
| 5,028,918 A | 7/1991 | Giles et al. |
| 5,047,613 A | 9/1991 | Swegen et al. |
| 5,056,643 A | 10/1991 | Kirberg |
| 5,083,271 A | 1/1992 | Thacher et al. |
| 5,105,069 A | 4/1992 | Hakenewerth et al. |
| 5,131,039 A | 7/1992 | Chaum |
| 5,147,021 A | 9/1992 | Maruyama et al. |
| 5,166,676 A | 11/1992 | Milheiser |
| 5,183,142 A | 2/1993 | Latchinian et al. |
| 5,185,798 A | 2/1993 | Hamada et al. |
| 5,198,976 A | 3/1993 | Form et al. |
| 5,206,495 A | 4/1993 | Kreft |
| 5,214,269 A | 5/1993 | Yamashita et al. |
| 5,220,501 A | 6/1993 | Lawlor et al. |
| 5,224,162 A | 6/1993 | Okamoto et al. |
| 5,239,662 A | 8/1993 | Danielson et al. |
| 5,240,368 A | 8/1993 | Graef et al. |
| 5,250,788 A | 10/1993 | Sugai et al. |
| 5,256,863 A | 10/1993 | Ferguson et al. |
| 5,265,033 A | 11/1993 | Vajk et al. |
| 5,280,527 A | 1/1994 | Gullman et al. |
| 5,285,382 A | 2/1994 | Muehlberger et al. |
| 5,297,030 A | 3/1994 | Vassigh et al. |
| 5,305,195 A | 4/1994 | Murphy |
| 5,309,355 A | 5/1994 | Lockwood |
| 5,326,960 A | 7/1994 | Tannenbaum |
| 5,350,906 A | 9/1994 | Brody et al. |
| 5,351,146 A | 9/1994 | Chan et al. |
| 5,351,296 A | 9/1994 | Sullivan |
| 5,371,797 A | 12/1994 | Bocinsky |
| 5,373,558 A | 12/1994 | Chaum |
| 5,376,778 A | 12/1994 | Kreft |
| 5,382,777 A | 1/1995 | Yuhara et al. |
| 5,397,886 A | 3/1995 | Mos et al. |
| 5,408,633 A | 4/1995 | Katsumura et al. |
| 5,420,405 A | 5/1995 | Chasek |
| 5,428,684 A | 6/1995 | Akiyama et al. |
| 5,429,361 A | 7/1995 | Raven et al. |
| 5,434,919 A | 7/1995 | Chaum |
| 5,435,542 A | 7/1995 | Van Pham et al. |
| 5,438,184 A | 8/1995 | Roberts et al. |
| 5,440,108 A | 8/1995 | Tran et al. |
| 5,440,479 A | 8/1995 | Hutton |
| 5,440,634 A | 8/1995 | Jones et al. |
| 5,442,567 A | 8/1995 | Small |
| 5,450,938 A | 9/1995 | Rademacher |
| 5,453,601 A | 9/1995 | Rosen |
| 5,454,332 A | 10/1995 | Fennelly et al. |
| 5,455,407 A | 10/1995 | Rosen |
| 5,461,217 A | 10/1995 | Claus |
| 5,465,206 A | 11/1995 | Hilt et al. |
| 5,473,143 A | 12/1995 | Vajk et al. |
| 5,484,997 A | 1/1996 | Haynes |
| 5,491,471 A | 2/1996 | Stobbe |
| 5,493,614 A | 2/1996 | Chaum |
| 5,497,463 A | 3/1996 | Stein et al. |
| 5,506,397 A | 4/1996 | Hoshino |
| 5,511,121 A | 4/1996 | Yacobi |
| 5,511,122 A | 4/1996 | Atkinson |
| 5,517,172 A | 5/1996 | Chiu |
| 5,517,569 A | 5/1996 | Clark |
| 5,521,980 A | 5/1996 | Brands |
| 5,530,232 A | 6/1996 | Taylor |
| 5,531,640 A | 7/1996 | Inoue |
| 5,534,857 A | 7/1996 | Laing et al. |
| 5,535,276 A | 7/1996 | Ganesan |
| 5,537,315 A | 7/1996 | Mitcham |
| 5,544,086 A | 8/1996 | Davis et al. |
| 5,544,322 A | 8/1996 | Cheng et al. |
| 5,546,523 A | 8/1996 | Gatto |
| 5,557,516 A | 9/1996 | Hogan |
| 5,557,518 A | 9/1996 | Rosen |
| 5,559,885 A | 9/1996 | Drexler et al. |
| 5,559,887 A | 9/1996 | Davis et al. |
| 5,564,546 A | 10/1996 | Molbak et al. |
| 5,572,643 A | 11/1996 | Judson |
| 5,576,951 A | 11/1996 | Lockwood |
| 5,577,121 A | 11/1996 | Davis et al. |

| | | | | | | |
|---|---|---|---|---|---|---|
| 5,589,855 | A | 12/1996 | Blumstein et al. | 5,781,909 | A | 7/1998 | Logan et al. |
| 5,590,038 | A | 12/1996 | Pitroda | 5,784,439 | A * | 7/1998 | Nagelmann et al. ...... 379/91.01 |
| 5,590,197 | A | 12/1996 | Chen et al. | 5,787,403 | A | 7/1998 | Randle |
| 5,594,233 | A | 1/1997 | Kenneth et al. | 5,789,732 | A | 8/1998 | McMahon et al. |
| 5,596,642 | A | 1/1997 | Davis et al. | 5,790,548 | A | 8/1998 | Sistanizadeh et al. |
| 5,600,114 | A | 2/1997 | Dunlap et al. | 5,796,832 | A | 8/1998 | Kawan |
| 5,602,905 | A | 2/1997 | Mettke | 5,802,199 | A | 9/1998 | Pare et al. |
| 5,610,382 | A | 3/1997 | Yamamoto | 5,802,299 | A | 9/1998 | Logan et al. |
| 5,613,001 | A | 3/1997 | Bakhoum | 5,802,497 | A | 9/1998 | Manasse |
| 5,613,012 | A | 3/1997 | Hoffman et al. | 5,809,144 | A | 9/1998 | Sirbu et al. |
| 5,615,277 | A | 3/1997 | Hoffman | 5,812,765 | A | 9/1998 | Curtis |
| 5,619,558 | A | 4/1997 | Jheeta | 5,815,657 | A | 9/1998 | Williams et al. |
| 5,620,079 | A | 4/1997 | Molbak | 5,816,720 | A | 10/1998 | Brannan et al. |
| 5,621,796 | A | 4/1997 | Davis et al. | 5,825,006 | A | 10/1998 | Longacre et al. |
| 5,623,547 | A | 4/1997 | Jones et al. | 5,826,017 | A | 10/1998 | Holzmann |
| 5,633,930 | A | 5/1997 | Davis et al. | 5,826,241 | A | 10/1998 | Stein et al. |
| 5,637,845 | A | 6/1997 | Kolls | 5,826,245 | A | 10/1998 | Sandberg-Diment |
| 5,641,050 | A | 6/1997 | Smith et al. | 5,826,267 | A | 10/1998 | McMillan |
| 5,644,118 | A | 7/1997 | Hayashida | 5,828,053 | A | 10/1998 | Kinugasa |
| 5,644,727 | A | 7/1997 | Atkins | 5,831,862 | A | 11/1998 | Hetrick et al. |
| 5,649,001 | A | 7/1997 | Thomas et al. | 5,832,089 | A | 11/1998 | Kravitz et al. |
| 5,649,117 | A | 7/1997 | Landry | 5,832,460 | A | 11/1998 | Bednar et al. |
| 5,650,604 | A | 7/1997 | Marcous et al. | 5,838,665 | A | 11/1998 | Kahn et al. |
| 5,650,605 | A | 7/1997 | Morioka et al. | 5,838,812 | A | 11/1998 | Pare, Jr. et al. |
| 5,652,421 | A | 7/1997 | Veeneman et al. | 5,842,211 | A | 11/1998 | Horadan et al. |
| 5,652,423 | A | 7/1997 | Saitoh et al. | 5,847,372 | A | 12/1998 | Kreft |
| 5,659,165 | A | 8/1997 | Jennings et al. | 5,850,442 | A | 12/1998 | Muftic |
| 5,659,616 | A | 8/1997 | Sudia | 5,854,581 | A | 12/1998 | Mori et al. |
| 5,661,283 | A | 8/1997 | Gallacher et al. | 5,859,416 | A | 1/1999 | Gatto |
| 5,668,878 | A | 9/1997 | Brands | 5,865,470 | A | 2/1999 | Thompson |
| 5,671,279 | A | 9/1997 | Elgamal | 5,866,889 | A | 2/1999 | Weiss et al. |
| 5,671,280 | A | 9/1997 | Rosen | 5,866,891 | A | 2/1999 | Fujimoto et al. |
| 5,673,309 | A | 9/1997 | Woynoski et al. | 5,870,473 | A | 2/1999 | Boesch et al. |
| 5,673,322 | A | 9/1997 | Pepe et al. | 5,870,721 | A | 2/1999 | Norris |
| 5,677,955 | A | 10/1997 | Doggett et al. | 5,870,724 | A | 2/1999 | Lawlor et al. |
| 5,682,027 | A | 10/1997 | Bertina et al. | 5,878,141 | A | 3/1999 | Daly et al. |
| 5,682,525 | A | 10/1997 | Bouve et al. | 5,880,446 | A | 3/1999 | Mori et al. |
| 5,684,291 | A | 11/1997 | Taskett | 5,889,266 | A | 3/1999 | Schrenk |
| 5,686,713 | A | 11/1997 | Rivera | 5,889,862 | A | 3/1999 | Ohta et al. |
| 5,689,565 | A | 11/1997 | Spies et al. | 5,889,941 | A | 3/1999 | Tushie et al. |
| 5,691,525 | A | 11/1997 | Aoki et al. | 5,893,907 | A | 4/1999 | Ukuda |
| 5,692,132 | A | 11/1997 | Hogan | 5,895,457 | A | 4/1999 | Kurowski et al. |
| 5,696,366 | A | 12/1997 | Ziarno | 5,897,625 | A | 4/1999 | Gustin et al. |
| 5,696,827 | A | 12/1997 | Brands | 5,899,982 | A | 5/1999 | Randle |
| 5,696,908 | A | 12/1997 | Muehlberger et al. | 5,901,229 | A | 5/1999 | Fujisaki et al. |
| 5,699,528 | A | 12/1997 | Hogan | 5,901,287 | A | 5/1999 | Bull et al. |
| 5,703,795 | A | 12/1997 | Mankovitz | 5,902,983 | A | 5/1999 | Crevelt et al. |
| 5,703,949 | A | 12/1997 | Rosen | 5,905,736 | A | 5/1999 | Ronen et al. |
| 5,704,046 | A | 12/1997 | Hogan | 5,905,810 | A | 5/1999 | Jones et al. |
| 5,710,887 | A | 1/1998 | Chelliah et al. | 5,909,023 | A | 6/1999 | Ono et al. |
| 5,712,913 | A | 1/1998 | Chaum | 5,917,913 | A | 6/1999 | Wang |
| 5,715,399 | A | 2/1998 | Bezos | 5,918,213 | A | 6/1999 | Bernard et al. |
| 5,722,564 | A | 3/1998 | Tiraboschi | 5,920,629 | A | 7/1999 | Rosen |
| 5,727,154 | A | 3/1998 | Fry et al. | 5,921,373 | A | 7/1999 | Amdahl et al. |
| 5,728,999 | A | 3/1998 | Teicher | 5,930,810 | A | 7/1999 | Farros et al. |
| 5,732,398 | A | 3/1998 | Tagawa | 5,936,220 | A | 8/1999 | Hoshino |
| 5,734,823 | A | 3/1998 | Saigh et al. | 5,940,811 | A | 8/1999 | Norris |
| 5,742,845 | A | 4/1998 | Wagner | 5,943,423 | A | 8/1999 | Muftic |
| 5,744,787 | A | 4/1998 | Teicher | 5,945,652 | A | 8/1999 | Ohki et al. |
| 5,745,886 | A | 4/1998 | Rosen | 5,949,043 | A | 9/1999 | Hayashida |
| 5,757,917 | A | 5/1998 | Rose et al. | 5,949,046 | A | 9/1999 | Kenneth et al. |
| 5,758,257 | A | 5/1998 | Herz et al. | 5,949,411 | A | 9/1999 | Doerr et al. |
| 5,761,306 | A | 6/1998 | Lewis | 5,949,492 | A | 9/1999 | Mankovitz |
| 5,761,683 | A | 6/1998 | Logan et al. | 5,951,620 | A | 9/1999 | Ahrens et al. |
| 5,762,376 | A | 6/1998 | Taskett | 5,952,639 | A | 9/1999 | Ohki et al. |
| 5,764,789 | A | 6/1998 | Pare et al. | 5,953,423 | A | 9/1999 | Rosen |
| 5,768,382 | A | 6/1998 | Schneier | 5,953,504 | A | 9/1999 | Sokal et al. |
| 5,768,385 | A | 6/1998 | Simon | 5,955,717 | A | 9/1999 | Vanstone |
| 5,773,812 | A | 6/1998 | Kreft | 5,962,831 | A | 10/1999 | Byrley |
| 5,774,663 | A | 6/1998 | Randle | 5,963,648 | A | 10/1999 | Rosen |
| 5,774,874 | A | 6/1998 | Veeneman et al. | 5,963,924 | A | 10/1999 | Williams et al. |
| 5,778,178 | A | 7/1998 | Arunachalam | 5,974,148 | A | 10/1999 | Stambler |
| 5,781,632 | A | 7/1998 | Odom | RE36,365 | E | 11/1999 | Levine |

| | | | |
|---|---|---|---|
| 5,987,439 A | 11/1999 | Gustin et al. | |
| 5,987,498 A | 11/1999 | Athing | |
| 5,987,500 A | 11/1999 | Arunachalam | |
| 5,988,509 A | 11/1999 | Taskett | |
| 5,991,410 A | 11/1999 | Albert et al. | |
| 5,992,570 A | 11/1999 | Walter et al. | |
| 5,995,949 A | 11/1999 | Morioka et al. | |
| 6,003,762 A | 12/1999 | Hayashida | |
| 6,003,763 A | 12/1999 | Gallagher et al. | |
| 6,003,764 A | 12/1999 | De Rooij et al. | |
| 6,012,048 A | 1/2000 | Gustin et al. | |
| 6,014,137 A | 1/2000 | Burns | |
| 6,014,646 A | 1/2000 | Vallee et al. | |
| 6,016,484 A | 1/2000 | Williams et al. | |
| 6,016,955 A | 1/2000 | De Rooij et al. | |
| 6,017,063 A | 1/2000 | Nilssen | |
| 6,023,498 A | 2/2000 | Schneider | |
| 6,029,147 A | 2/2000 | Horadan et al. | |
| 6,032,857 A | 3/2000 | Kitagawa et al. | |
| 6,035,380 A | 3/2000 | Shelton et al. | |
| 6,038,551 A | 3/2000 | Barlow et al. | |
| 6,039,250 A | 3/2000 | Ito et al. | |
| 6,047,067 A | 4/2000 | Rosen | |
| 6,047,888 A | 4/2000 | Dethloff | |
| 6,048,271 A | 4/2000 | Barcelou | |
| 6,055,314 A | 4/2000 | Spies et al. | |
| 6,068,193 A | 5/2000 | Kreft | |
| 6,070,803 A | 6/2000 | Stobbe | |
| 6,081,791 A | 6/2000 | Clark | |
| RE36,788 E | 7/2000 | Mansvelt et al. | |
| 6,085,177 A | 7/2000 | Semple | |
| 6,088,687 A | 7/2000 | Leleu | |
| 6,088,722 A | 7/2000 | Herz et al. | |
| 6,098,890 A | 8/2000 | Kreft | |
| 6,105,007 A | 8/2000 | Norris | |
| 6,115,458 A | 9/2000 | Taskett | |
| 6,126,069 A | 10/2000 | Stiefel et al. | |
| 6,128,402 A | 10/2000 | Jones et al. | |
| 6,131,810 A | 10/2000 | Weiss et al. | |
| 6,138,107 A | 10/2000 | Elgamal | |
| 6,141,666 A | 10/2000 | Tobin | |
| 6,144,848 A | 11/2000 | Walsh et al. | |
| 6,149,055 A | 11/2000 | Gatto | |
| 6,179,457 B1 | 1/2001 | Simonotti et al. | |
| 6,193,154 B1 | 2/2001 | Phillips et al. | |
| 6,202,054 B1 | 3/2001 | Lawlor et al. | |
| 6,202,924 B1 | 3/2001 | Saunders | |
| RE37,122 E | 4/2001 | Levine | |
| 6,215,858 B1 | 4/2001 | Bartholomew et al. | |
| 6,230,928 B1 | 5/2001 | Hanna et al. | |
| 6,237,848 B1 | 5/2001 | Everett | |
| 6,285,745 B1 | 9/2001 | Bartholomew et al. | |
| 6,289,319 B1 | 9/2001 | Lockwood | |
| 6,325,242 B1 | 12/2001 | Izawa et al. | |
| 6,327,579 B1 | 12/2001 | Crawford | |
| 6,341,272 B1 | 1/2002 | Randle | |
| 6,366,893 B2 | 4/2002 | Hannula et al. | |
| 6,408,307 B1 | 6/2002 | Semple et al. | |
| 6,434,238 B1 | 8/2002 | Chaum et al. | |
| 6,438,527 B1* | 8/2002 | Powar | 705/40 |
| 6,439,455 B1 | 8/2002 | Everett et al. | |
| 6,442,532 B1 | 8/2002 | Kawan | |
| 6,507,823 B1 | 1/2003 | Nel | |
| 6,583,813 B1 | 6/2003 | Enright et al. | |
| 6,708,176 B2 | 3/2004 | Strunk et al. | |
| 6,945,457 B1* | 9/2005 | Barcelou | 235/380 |
| 7,040,533 B1 | 5/2006 | Ramachandran | |
| 7,156,300 B1 | 1/2007 | Dentlinger | |
| 2001/0016825 A1 | 8/2001 | Pugliese | |
| 2001/0044747 A1 | 11/2001 | Ramachandran et al. | |
| 2001/0044775 A1 | 11/2001 | Saito et al. | |
| 2003/0120597 A1 | 6/2003 | Drummond | |
| 2005/0211764 A1 | 9/2005 | Barcelou | |
| 2005/0246292 A1 | 11/2005 | Sarcanin | |
| 2008/0061129 A1 | 3/2008 | Barcelou | |
| 2008/0061130 A1 | 3/2008 | Barcelou | |
| 2008/0061131 A1 | 3/2008 | Barcelou | |
| 2008/0061132 A1 | 3/2008 | Barcelou | |
| 2008/0061133 A1 | 3/2008 | Barcelou | |
| 2008/0061134 A1 | 3/2008 | Barcelou | |
| 2008/0061135 A1 | 3/2008 | Barcelou | |
| 2008/0065536 A1 | 3/2008 | Barcelou | |
| 2008/0065537 A1 | 3/2008 | Barcelou | |
| 2008/0065538 A1 | 3/2008 | Barcelou | |
| 2008/0065539 A1 | 3/2008 | Barcelou | |
| 2008/0065540 A1* | 3/2008 | Barcelou | 705/43 |
| 2008/0065541 A1* | 3/2008 | Barcelou | 705/43 |
| 2008/0065542 A1 | 3/2008 | Barcelou | |
| 2008/0065543 A1 | 3/2008 | Barcelou | |
| 2008/0065544 A1 | 3/2008 | Barcelou | |
| 2008/0065545 A1 | 3/2008 | Barcelou | |
| 2008/0067234 A1 | 3/2008 | Barcelou | |
| 2008/0067235 A1* | 3/2008 | Barcelou | 235/379 |
| 2008/0067236 A1 | 3/2008 | Barcelou | |
| 2008/0067237 A1 | 3/2008 | Barcelou | |
| 2008/0067238 A1 | 3/2008 | Barcelou | |
| 2008/0067239 A1* | 3/2008 | Barcelou | 235/379 |
| 2008/0093439 A1 | 4/2008 | Barcelou | |
| 2008/0093440 A1 | 4/2008 | Barcelou | |
| 2008/0093443 A1* | 4/2008 | Barcelou | 235/380 |
| 2008/0125215 A1 | 5/2008 | Barcelou | |

OTHER PUBLICATIONS

Office Action mailed Apr. 17, 2008 for U.S. Appl. No. 11/982,186 to D. Barcelou.
Office Action mailed May 14, 2008 for U.S. Appl. No. 11/981,965 to D. Barcelou.
Office Action mailed Feb. 26, 2008 for U.S. Appl. No. 11/982,240 to D. Barcelou.
Office Action mailed Feb. 25, 2008 for U.S. Appl. No. 11/982,241 to D. Barcelou.
Office Action mailed May 13, 2008 for U.S. Appl. No. 11/982,244 to D. Barcelou.
U.S. Appl. No. 90/008,323 to D. Barcelou, Nov. 7, 2006.
"An ATM for Everything," John Schneltzer, Dec. 26, 1995, Chicago Tribune, St. Louis Post-Dispatch.
EDS Pamphlet: "Destination: Convenience," Dec. 1995.
ICM— Banking on the I-way Today and Tomorrow, John Doggett, Mar. 23-24, 1995.
AT&T News Release: "New ATM from AT&T GIS Features Automated Document Processing," Nov. 29, 1994.
"Kiosk Issues Bank Cards for Those Dashing though Dough," The Courier Journal, vol. 269, No. 155, p. 12, Dec. 2, 1989, Ken Berzof.
"Trade-It-Yourself Bank Machines Make a Debut Securities: Citibank is First to Offer Full-scale Brokerage Services at ATM Machines Option Comes to California Next Month," Los Angeles Times, Oct. 6, 1994.
"The ABC 7000: The 21st Century Has Arrived," Basecorp, 1995.
"Technobanking Takes Off," Business Week, Dec. 12, 1994.
"Do Bells and Whistles Really Pay Off?", Joseph L. McCarthy, Nov. 27, 1995.
"ATM Revolution Keeps Marching On," Jane B. Sharahan, Nov. 27, 1995.
"Marching to 2000 with a Range of Functions," Janice Fioravante, Nov. 27, 1995.
"Will Versatility Fuel Continued Growth?", Janice Floravante, Nov. 27, 1995.
"Nonbanks Close Gap on Off-site ATMs,"Julie Monahan, Nov. 27, 1995.
"Kiosks, PCs take borrowing out of banks" May 2, 1996 Christine Dugas, Cover Story, USA Today.
"Multimedia Hits the Streets" Feb. 1995 Jirl Weiss, New Media.
Have you ever renewed your driver's license at a cash machine?-"You Will" AT&T Ad, 1994.

"Money: Back to the Future?" Nov. 24, 1995 Walter Wriston, Wall Street Journal.

Ultradata Corporation Product Update Brochure: "Self-Service Kiosk & Automated Loan Processing System (ALPS)", Nov. 1995.

Affinity Financial Group, Inc. Brochure—"Revolution in Progress: The Automated Loan Machine", 1995.

Ameritrade Holding Corporation History—Aufhauser is the first brokerage firm to offer internet trading via its WealthWeb (Aug. 1994).

Digital Equipment Corporation Brochure—"DECbank WB21 for compact cash delivery" and "DECbank WB22 Full Function Walk-Up ATM", Mar. 1994.

Digital Equipment Corporation Brochure—"Integrating Banking Beyond Branches", 1995.

Digital Equipment Corporation Brochure—Digital's Distributed Computing Environment (DCE), 1994.

Digital Equipment Corporation White Paper—"Digital DCE for Windows NT", Jun. 1995.

"TP Monitor Brings DCE Down to Earth", Bradley F. Shimmin, LAN Times, Mar. 18, 1996.

Microsoft Corporation—"Microsoft and DCE", Deborah Black. Nov. 1, 1993.

1995 Schlumberger Annual Report (Online Version), 1996.

Schlumberger Danyl Brochure "Card Dispensing Machine", Dec. 1, 1995.

Schlumberger Danyl Brochure "Card Value Center", Nov. 6, 1995.

Danyl Corporation Brochure—"Card Service Center", Apr. 12, 1993.

Danyl Corporation Brochure—"Vending Systems—Opening New Horizons with Card-based Convenience", Sep. 27, 1993.

1995 AT&T (NCR) Annual Report, Apr. 18, 1996.

"The ATM Marks Its 30th Birthday", Jo-Ann Daddio, Smart Money Debit News, vol. 1—Issue 4, p. 4, Winter 1995.

"Doo-Wah Cash: MTV Meets ATM", Upfront—Bank Notes, Seanna Browder, Business Week, p. 6, Dec. 4, 1995.

"Marketing & Vending Concepts' ATM-Telecard Vender Promotes Sales by Making it Easier to Purchase Cards", Vending Times, Mar. 1996.

"Hold It Right There Citibank", Banking, Brian Brenner, Joan Warner and Jonathan Ford, Business Week, p. 176, Mar. 25, 1996.

"Visa International charges ahead with stored-value card", Enterprise Computing—Management, Rachel Parker, InfoWorld, p. 78, Oct. 16, 1995.

"Smart Cards and Money: Convenience and Security", Cover Story, Anne Coyle, EDN Nov. 23, 1995.

"Money Wants to Be Anonymous", Alan Deutschman, Worth, p. 95, Oct. 1995.

CyberCash Inc. Brochure, "CyberCash—The Secure Internet Payment Service", 1995.

"Wide Area Windows Networking—Are NT and Windows for Workgroups Truly WAN-savvy?", Hands On, Jon Udell, Byte Magazine, Jan. 1994.

Mondex International News Release, "Mondex Uses Internet to Spread Global Electronic Cash Message", Mar. 24, 1995.

Mondex Magazine (Launch Issue) 36pgs, National Westminister Bank Plc, 1995.

UUNET Technologies, Inc. Brochure, "Access the Internet with Alternet", Aug. 17, 1994.

UUNET Technologies, Inc. Brochure, "Alternet Product Family", May 18, 1994.

Cincinnati Microwave, Inc. Brochure, "Cellular Packet Data Moderns", CMI, 1993.

Pacific Communication Sciences Inc. Brochure, Ubiquity Software Developer's Kit (CDPD), Nov. 1994.

Gradient Technologies, Inc. Brochure, "Secure Web Client/Server Computing", 1995.

Transarc Corporation Brochure, "DCE Product Overview", 1993.

Transarc Corporation Brochure, "Encina Product Overview", 1993.

ICM—Banking on the I-way Today and Tomorrow, John Doggett, Mar. 23-24, 1995.

"Kiosk Issues Bank Cards for Those Dashing Through Dough," The Courier Journal, vol. 269, No. 155, p. 12, Dec. 2, 1989, Ken Berzof.

The DCE Newsletter—Open Horizon, Inc., "DCE and the Web", vol. 3—Issue 2, 1995.

Laufer, "Interactive Web Application Based on Finite State Machines", Loyola University (Chicago), Proc. Symposium Information Systems Analysis and Synthesis (ISAS), Baden-Baden, Germany, Aug. 1995.

Morris et al., "Kiosks: A Technological Overview", Los Alamos National Laboratory, Paper LA-UR-95-1672 (CIC-3) Jan. 10, 1995.

Levy, "E-Money (That's What I Want)", Wired Magazine, Issue 2.12, Dec. 1994.

EFT Network Data Book—1996 Edition, Bank Network News, Faulkner & Gray, vol. 14, No. 13, Nov. 24, 1995.

Medvinsky et al., "Netcash: A Design for Practical Electronic Currency on the Internet", Proc. First ACM Conference on Computer and Communication Security, Nov. 1993.

Perrochon, "W3 Based Online Kiosk Systems", Int'l WWW Conference, Apr. 10, 1995.

"Interactive Financial Services—Strategies for Online Delivery", Longwood Information LLC. vol. 1, No. 3, Apr. 15, 1996.

"Kiosks—Guidelines for Development", The State of Maryland Comptroller of the Treasury—Data Processing Division, Sep. 15, 1994.

Shah, "Suggestions for Information Kiosk Systems Using the World Wide Web", WWW Information Kiosks Special Interest Group, Apr. 30, 1994.

"Diebold—Technology with a Vision", 1995 Annual Report.

Shah, "Suggestions for Information Kiosk Systems Using the World Wide Web", WWW Information Kiosks Special Interest Group, May 25, 1994.

Griffith. "Cashless Society or Digital Cash?", Southwestern Society of Economists, Mar. 1994.

Brickell et al., "Trustee-based Tracing for Electronic Cash and Making Anonymous Change", 1995 Symposium on Discrete Algorithms.

Bellare et al., Design Implementation and Deployment of the iKP Secure Electronic Payment System, Extended abstract, entitled "IKP—A Family of Secure Electronic Payment Protocols" was in Proc. First USENIX Workshop on Electronic Commerce, USENIX, 1995, IEEE Journal on selected Areas in Communication, 2000, vol. 18, No. 4, pp. 611-627.

Chaum, "Achieving Electronic Privacy", Scientific American, Inc., 1992.

Neuman, "Proxy-Based authorization and Accounting for Distributed Systems", Proceedings of the 13th Int'l Conference on Distributed Computing Systems, May 1993.

"Siemens Nixdorf Customer Information Printer—CIP", Company Brochure 1994.

"Siemens Nixdorf ATMs and Cash Dispensers Overview", Company Brochure 1995.

Rakov, "The Internet Sampler: A Mosaic-Based Museum Kiosk About the Internet", 2nd Int'l Conference on Mosaic and the WWW. Chicago, IL, Oct. 1994.

Chaum, "Digital Cash", Mediamatic@Home Conference, Nov. 5, 1994.

"SCR 60 Terminal", Schlumberger Technologies Brochure, 1992.

"The AnyCard Cash System", Tidel Engineering, Inc. Feb. 2, 1993.

Merkert. Sr., "Multi-application Cards in Open Systems", Danyl Corporation, Apr. 9, 1993.

"IC Verify—High Performance Credit Card Authorization, ATM/Debit and Check Guarantee Software", IC Systems Brochure, Oct. 28, 1993.

"DEC OSF/1", Digital Equipment Corporation Brochure, 1994.

"Schlumberger MULTIFLEX Smart Cards", Schlumberger Technologies Brochure, 1994.

"Mikron Austria Company Profile", Mikron GmbH Brochure, Mar. 3, 1995.

"Mikron micard—Contactless Close Coupling High Speed RIScC Processor Smart Card", Mikron GmbH Brochure, Feb. 1994.

"Mikron midat—Contactless Read/Write Identification System", Mikron GmbH Brochure, May 1994.

"Mikron miro—Contactless Read Only Identification System," Mikron GmbH Brochure, Aug. 1994.

"Mikron hltag—Contactless Read/Write Identification System for Handsfree Access Control and Industrial Applications", Mikron GmbH Brochure, Sep. 1994.

"Mikron mifare—MIFARE1 Card Data Sheet", Mikron GmbH Brochure, Sep. 1994.
"Mikron mifare—Contactless Remote Coupling Smart Card System Overview", Mikron GmbH Brochure, Sep. 1994.
"Mikron mifare—MIFARE read/write device Core Module (MCM) Data Sheet", Mikron GmbH Brochure, Sep. 1994.
"Software Product Description—Digital Distributed Computing Environment (DCE), Version 1.0 for Window NT", Digital Equipment Corporation Brochure, Apr. 1994.
"InstaCache", National CacheCard Co. Brochure, Sep. 12, 1994.
"GEMPLUS in Banking", Gemplus Brochure, Oct. 1994.
"VISA Stored Value Cards Product Preview", VISA International Service Association, Dec. 1994.
"Smart Cards", Giesecke & Devrient Brochure, 1995.
"Welcome to the World of Radio Frequency Identification and Contactless Smart Cards", Mikron GmbH Brochure, 1995.
"WinPractis software—Take advantage of a Window development platform . . . and create your smartcard applications", Schlumberger Electronic Transactions, 1995.
"Microsoft and DCE", The DCE Newsletter—Anniversary Issue, vol. 2 Issue 4, pp. 1-5, 1995. . "Single Sign-On with Microsoft Products and Technologies", The DCE Newsletter, vol. 3, Issue 1. pp. 16-19, 1995.
"Alpha Family Systems Summary", Digital Equipment Corporation Brochure, Apr. 1995.
"Introducing True ID from Image Data", Image Data, LLC Brochure, 1995.
"Requirements for Network Payment: The NetCheque Perspective", Proc. of IEEE Compcon 95, San Francisco, CA, Mar. 1995.
"Wizard Integrated Contactless Smartcard Solution", Card Technologies Australia Limited Brochure, 1995.
"Smart Solutions for Secured Transactions", CP8 Transac Products Brochure, 1995.
"Bank rolls out smart card", USA Today—Inside Business, Mar. 21, 1995.
Birch et al., "Paying Tolls on the Infobahn—Electronic Commerce and the Future of Money", Hyperion, Commerce and Banking on the Information Superhighway, Chicago, IL, Mar. 23, 1995.
Office Action dated Oct. 31, 2008 for U.S. Appl. No. 11/981,963.
Amendment dated Apr. 21, 2009 for U.S. Appl. No. 11/981,963.
Final Office Action dated Jun. 24, 2009 for U.S. Appl. No. 11/981,963.
Remarks dated Nov. 13, 2008 for U.S. Appl. No. 11/981,993.
Office Action dated Jan. 30, 2009 for U.S. Appl. No. 11/981,993.
Remarks dated Jul. 27, 2009 for U.S. Appl. No. 11/981,993.
Office Action dated May 5, 2009 for U.S. Appl. No. 11/981,991.
Amendment dated Oct. 26, 2009 for U.S. Appl. No. 11/981,991.
Office Action dated Jun. 11, 2008 for U.S. Appl. No. 11/982,024.
Remarks dated Dec. 11, 2008 for U.S. Appl. No. 11/982,024.
Office Action dated Oct. 15, 2008 for U.S. Appl. No. 11/982,045.
Amendment dated Apr. 15, 2009 for U.S. Appl. No. 11/982,045.
Final Office Action dated May 13, 2009 for U.S. Appl. No. 11/982,045.
Notice of Appeal dated Nov. 13, 2009 for U.S. Appl. No. 11/982,045.
Office Action dated May 4, 2009 for U.S. Appl. No. 11/982,187.
Amendment dated Oct. 26, 2009 for U.S. Appl. No. 11/982,187.
Office Action dated Nov. 20, 2008 for U.S. Appl. No. 11/982,044.
Remarks dated May 8, 2009 for U.S. Appl. No. 11/982,044.
Final Office Action dated Sep. 15, 2009 for U.S. Appl. No. 11/982,044.
Notice of Appeal dated Nov. 16, 2009 for U.S. Appl. No. 11/982,044.
Remarks dated Oct. 15, 2008 for U.S. Appl. No. 11/982,186.
Final Office Action dated Mar. 5, 2009 for U.S. Appl. No. 11/982,186.
Notice of Appeal dated Sep. 8, 2009 for U.S. Appl. No. 11/982,186.
Remarks dated Nov. 13, 2008 for U.S. Appl. No. 11/981,965.
Final Office Action dated Mar. 17, 2009 for U.S. Appl. No. 11/981,965.
Remarks dated May 11, 2009 for U.S. Appl. No. 11/981,965.
Office Action dated Apr. 8, 2009 for U.S. Appl. No. 11/981,969.
Amendment dated Oct. 6, 2009 for U.S. Appl. No. 11/981,969.
Remarks dated Sep. 26, 2008 for U.S. Appl. No. 11/982,240.
Office Action dated Dec. 8, 2008 for U.S. Appl. No. 11/982,240.
Remarks dated Jun. 4, 2009 for U.S. Appl. No. 11/982,240.
Office Action dated Sep. 4, 2008 for U.S. Appl. No. 11/981,961.
Remarks dated Mar. 3, 2009 for U.S. Appl. No. 11/981,961.
Office Action dated Jun. 26, 2009 for U.S. Appl. No. 11/981,961.
Remarks dated Nov. 24, 2009 for U.S. Appl. No. 11/981,961.
Office Action dated Oct. 30, 2008 for U.S. Appl. No. 11/981,959.
Amendment dated Apr. 21, 2009 for U.S. Appl. No. 11/981,959.
Final Office Action dated Jun. 24, 2009 for U.S. Appl. No. 11/981,959.
Office Action dated Sep. 17, 2008 for U.S. Appl. No. 11/981,920.
Remarks dated Mar. 10, 2009 for U.S. Appl. No. 11/981,920.
Remarks dated Aug. 25, 2008 for U.S. Appl. No. 11/982,241.
Office Action dated Dec. 8, 2008 for U.S. Appl. No. 11/982,241.
Remarks dated Jun. 4, 2009 for U.S. Appl. No. 11/982,241.
Office Action dated May 4, 2009 for U.S. Appl. No. 11/981,994.
Amendment dated Oct. 26, 2009 for U.S. Appl. No. 11/981,994.
Office Action dated Oct. 9, 2008 for U.S. Appl. No. 11/982,043.
Remarks dated Apr. 9, 2009 for U.S. Appl. No. 11/982,043.
Office Action dated May 7, 2009 for U.S. Appl. No. 11/982,043.
Remarks dated Nov. 4, 2009 for U.S. Appl. No. 11/982,043.
Supplemental Remarks dated Nov. 5, 2009 for U.S. Appl. No. 11/982,043.
Office Action dated Feb. 27, 2009 for U.S. Appl. No. 11/981,964.
Amendment dated May 8, 2009 for U.S. Appl. No. 11/984,964.
Final Office Action dated Jul. 14, 2009 for U.S. Appl. No. 11/981,964.
Remarks dated Nov. 13, 2008 for U.S. Appl. No. 11/982,244.
Final Office Action dated Mar. 13, 2009 for U.S. Appl. No. 11/982,244.
Notice of Appeal dated Sep. 14, 2009 for U.S. Appl. No. 11/982,244.
Office Action dated Oct. 16, 2008 for U.S. Appl. No. 11/981,992.
Remarks dated Apr. 15, 2009 for U.S. Appl. No. 11/981,992.
Office Action dated May 7, 2009 for U.S. Appl. No. 11/981,992.
Remarks dated Nov. 4, 2009 for U.S. Appl. No. 11/981,992.
Office Action dated Nov. 13, 2009 for U.S. Appl. No. 11/981,992.
Remarks dated May 8, 2009 for U.S. Appl. No. 11/981,968.
Office Action dated Oct. 1, 2008 for U.S. Appl. No. 11/981,988.
Amendment dated Mar. 17, 2009 for U.S. Appl. No. 11/981,988.
Final Office Action dated May 7, 2009 for U.S. Appl. No. 11/981,988.
Notice of Appeal dated Nov. 9, 2009 for U.S. Appl. No. 11/981,988.
Office Action dated Sep. 11, 2008 for U.S. Appl. No. 11/981,966.
Remarks dated Mar. 10, 2009 for U.S. Appl. No. 11/982,966.
Office Action dated Jan. 5, 2009 for U.S. Appl. No. 11/982,243.
Remarks dated Jul. 6, 2009 for U.S. Appl. No. 11/982,243.
Final Office Action dated Oct. 30, 2009 for U.S. Appl. No. 11/982,243.
Remarks dated Nov. 14, 2009 for U.S. Appl. No. 11/982,243.
Supplemental Remarks dated Nov. 5, 2009 for U.S. Appl. No. 11/982,243.
Office Action dated Dec. 13, 2006 for U.S. Appl. No. 11/123,982.
Amendment dated Jun. 13, 2007 for U.S. Appl. No. 11/123,982.
Final Office Action dated Aug. 29, 2007 for U.S. Appl. No. 11/123,982.
Notice of Appeal dated Feb. 28, 2008 for U.S. Appl. No. 11/123,982.
Response dated Sep. 26, 2008 for U.S. Appl. No. 11/123,982.
Final Office Action dated Dec. 16, 2008 for U.S. Appl. No. 11/123,982.
Notice of Appeal dated Jun. 15, 2009 for U.S. Appl. No. 11/123,982.
"Ameritech and Cash Station Inc. Announces Prepaid Phone Card Deal," Newswire, Oct. 17, 1995.
Wenninger et al., "The Electronic Purse", Federal Reserve Bank of NY—Current Issues in Economics and Finance, vol. 1, No. 1, Apr. 1995.
"Gemplus and National CacheCard Announce the First High Volume Issuance of a 64k Bit Smart Card", Gemplus Press Release, Apr. 11, 1995.
"AT&T Smart Cards—Financial Services Report", Phillips Publishing, Inc., Apr. 25, 1995.
Gross, "EIDOS Never Forgets a Face", Business Week, Developments to Watch, May 15, 1995.
"Payment Card Organizations Detail Next Steps on Global Chip Card Specifications", VISA News Release, VISA International, May 31, 1995.

"An Insider's Guide to Microsoft RPC", O'Reilly & Associates, Summer 1995.
Singleton, "Cash on the Wirehead", Byte Magazine, Jun. 1995.
Jackel et al., "Optical Character Recognition for Self-Service Banking", AT&T Technical Journal, Jul./Aug. 1995.
"Progress Report [Columbia-Presbyterian Medical Center Patient Klosk], Applied Informatics", Jul. 15, 1995.
"American Express partners with leading technology firms to allow cardmembers to make purchases over the Internet", American Express Company News Release, Jul. 17, 1995.
Manasse, "The Millicent Protocols for Electronic Commerce", Digital Equipment Corporation, Proc. First USENIX Workshop on Electronic Commerce, New York, NY, Aug. 1995.
"Financial Services Industry Leaders to Form SmartCash", News Release, MasterCard International and Electronic Payment Services, Inc., Aug. 16, 1995.
"Introducing VISA Cash", VISA International Service Association, Sep. 1995.
Gates, "Windows 95—Gateway to the Future", Microsoft Magazine—Interface, Sep./Oct. 1995.
"Size Up Your Needs", LEI USA Advertisement, DCR Debit Card Vending Machine, TeleCard World 95 East, Sep. 1995.
Chaum, "Keynote Address Internet@Telecom 95", Digicash, Oct. 8, 1995.
"Cash Is Good. This is Better." First Union Brochure, Oct. 16, 1995.
"Fujitsu Unveils series 7000 Advanced Platform ATMs and Cash Dispensers", Fujitsu ICL Systems, Inc. News Release, Oct. 17, 1995.
Washburn, "The Invisible Revolution", Internet World Magazine, pp. 37-38, Nov. 1995.
"St. Louie Bank Offers E-Cash", Interactive Week Magazine—Money, pp. 62, Nov. 6, 1995.
"Diebold Special Advertising Section", Forbes Magaine pp. 288-289, Nov. 6, 1995.
Haran, "Kiosks' Mass Appeal", Advertising Age—Events and Promotions, Nov. 6, 1995.
"Stored Value Card to be Called VISA Cash", VISA International Service Association. Nov. 9, 1995.
"Stored Value Cards—The Automation of Cash and Coins", VISA International Service Association, Nov. 1995.
Schreiber, "Unify Security to Speed Development", Datamation Magazine, pp. 78-81, Nov. 15, 1995.
"Micro Payment Transfer Protocol (MPTP) Version 1.0", W3C Working Draft—WD-mptp-951122, Nov. 22, 1995.
"VISA Cash Stored Value Card—Leading Change", VISA International Service Association Brochure, Nov. 29, 1995.
"ATM Kiosks/Enclosures", Dellman Industrial Corporation Brochure, Retail Delivery Show, Dec. 2-6, 1995.
"Bidirectional Dispersing Mechanisms (C-623LC Series)", Perto—A Digicon Company Brochure, Retail Delivery Show, Dec. 2-6, 1995.
"MICR Reader, Printer, Encoder—Pertochek", Perto—A Digicon Company Brochure, Retail Delivery Show, Dec. 2-6, 1995.
Shade, "Debit Card Strategies: POS to Smart Cards", Verifone, Retail Delivery Show, Dec. 3, 1995.
"Staying Ahead in a World of Change", MasterCard International Incorporated Brochure, Retail Delivery Show, Dec. 2-6, 1995.
"SmartCash—Consumer Research & Merchant Research", Retail Delivery Show, Dec. 2-6, 1995.
Anderson, "Showdown Over E-Cash", Upside Magazine, Jan. 1996, pp. 25, 26, 30, 32, 34 and 36.
Paul. "Banking on the Future", PC Week Magazine, pp. E4-E5, Jan. 29, 1996.
Thompson, "An Alpha in PC Clothing", Byte Magazine, pp. 195-196, Feb. 1996.
Akst, "Numbers that are Money", Los Angeles Times, Feb. 4, 1996.
Davis, "MicroTouch to Offer Broswer for Public Web Stations", InfoWorld Publishing Company, vol. 18, Issue 8, Feb. 19, 1996.
"IDI Blazes Trail Into Vending Computer Systems and Net Surfing". Vending Times, pp. 102, Mar. 1996.
Chappell, "DCE and Objects", Chappell & Associates, The Open Group DCE Portal, Mar. 1996.
Anderson et al., "Netcard—A Practical Electronic Cash System", Cambridge University Computer Laboratory, Apr. 1996.

Dugas, "Putting Smart Cards to Work—Rival Card Networks Join in Pilot Program", USA Today Cover Story, Apr. 11, 1996.
Rivest et al., "PayWord and MicroMint: Two Simple Micropayment Schemes", MIT Laboratory for Computer Science and Weizmann Institute of Science, May 7, 1996.
Lynch et al., "The New Era of Internet Commerce", John Wiley & Sons, Inc., Nov. 1, 1995.
Thomas, "IPng and the TCP/IP Protocols: Implementing the Next Generation Internet", John Wiley & Sons, Inc., Jan. 31, 1996, Chapters 1, 2, 15.
Koelsch, "The Infomedia Revolution: How it is changing our world and your life", McGraw-Hill Companies, Mar. 1, 1995 Part 1—Chapter 2 and Part 4—Chapter 12.
Courtney et al., "Smart Card Technology International", The Global Projects Group, 1995.
Chaum, "Smart Card 2000", North-Holland, 1991, Elsevier Science Publishers B.V., Selected Papers from the 2nd Int'l Smart Card 2000 Conference, Amsterdam, Oct. 4-6, 1989. The Card Itself—pp. 3-18, Payment Applications Today—pp. 57-76, and Applications: The Future—pp. 127-158.
Zoreda et al., "Smart Cards", Artech House, Inc., 1994, Chapters 1,2,3—pp. 1-54, and Chapters 7 and 8—pp. 123-164.
Rosenberry et al., "Distributing Applications AcrossDCE and Windows NT", O'Reilly & Associates, Oct. 1, 1993, Chapter 1, pp. 1-14.
Rosenberry et al., "Understanding DCE", O'Reilly & Associates, Sep. 1992, Chapter 1, pp. 3-22.
Steiner et al., "Technology in Banking", Irwin Professional Publishing—McKinsey & Company, 1990, Part 1—Chapter 2, pp. 28-50, and Part 2—Chapter 4, pp. 79-111.
Bollenbacher, "The New Business of Banking", Bankers/Probus Publishing Company, 1992, pp. 116-118, 148, 149, 167, 169, 196, 217, 221.
Mrkvicka, Jr., "The Bank Book", Harper Collins Publishers, 1991, Chapter 6 (Bank Services) pp. 140-168.
Kelly, "Out of Control", Addison-Wesley Publishing Company, 1994, Chapter 12, [E-Money] pp. 203-229.
Zweig, "Wriston—Walter Wriston, Citibank, and the Rise and Fall of Financial Supremacy", Crown-Publishers, Inc. 1995, [ATMs] pp. 197,278,284-286, 291-294, 536-557, 612-616,672,734,797, 838-839, 875.
R. Brown, et al., The Guide to United States Popular Culture, Popular Press (2001).
Betsy Maestro, The Story of Money, Carion Books (1993).
World Book Dictionary (1995) at p. 138.
J. Shanahan, ATM Revolution Keeps Marching On, Form & Function, Where Does the ATM Go From Here (Nov. 18, 1995).
J. Fioravante, Marching to 2000 With a Range of Functions, Form & Function, Where Does the ATM Go From Here (Nov. 27, 1995).
J. McAndrews, Automated Teller Machine Network Pricing—A Review of the Literature, Review of Network Economics, vol. 2, 146-158 (Jun. 2003).
D. Humphrey, Delivering Deposit Services; ATMs Verses Branches, Federal Reserve Bank of Richmond Economic Quarterly vol. 80, 58-91 (Spring 1994).
ATMs Through History, GSQ vol. 6, No. 3 (Sep. 2003).
1994 ACI Base 24-ATM Diebold 100x Series Support Manual.
Speaking a Common ATM Language, Credit Card Management Magazine (Apr. 2003).
2005 Diebold Brochure "ATMs Security Office".
The IFX Standard: Global Adoption is Only a Matter of Time Celent (2006).
2005 NCR Brochure.
1997 NCR Model 5670 ATM and Model 5675 ATM Brochures.
J. Rawe, A Mini-Mall in Your ATM, Time pg. 61 (Apr. 8, 2002).
7-Eleven to expand Vcom Kiosks to 1000 stores, Dallas Business Journal (Jul. 9, 2002).
A. All, Vcom =More Units, More Functionality, Kiosk Marketplace (Aug. 6, 2002).
A. All, 7-Eleven's Vcom Wins Raves at RD, ATM Marketplace (Nov. 13, 2002).
International 2002 ATM Award Winners.
NCR, The Automation Revolution: Self-Service as to Strategic Channel (2005).

FNC Resolution (Oct. 24, 1995).
Besser, The Information Superhighway (1995).
Dial-UP ATMs Ring in Changes in the ATM World, Bank Network News 15 (16) (Jan. 13, 1997).
R. Zakon, "Hobbes' Internet Timeline v 8.2", www.zakon.org/robert/internet/timeline (2006).
A Little History of the World Wide Web, www.w3.org/History.html (Circa 1995).
AT&T Advertisement "You Will" (1994).
Self Service Kiosk Product Update, Creative Strategies (1995).
F. Koelsch, The Information Revolution (1995).
Jay W. Giesen, Vice President and General Manager, Vcom, Powerpoint Presentation to 7-Eleven, Inc. (Jul. 29, 2003).
January 1995 GAO Report, "Information Superhighway".
December 4, 1996 Diebold Press Release.
Subrizi et al., "The Virtual ATM" by Alex Subrizi et al. Bank Marketing (Nov. 1994) pp. 17-20.
Vizard, "Building the Information Superhighway" by Frank Vizard Popular Mechanics (Jan. 1994) pp. 29-33.

* cited by examiner

AUTOMATED TRANSACTION MACHINE

CROSS-REFERENCE TO RELATED APPLICATIONS

This application is a continuation of U.S. application Ser. No. 11/818,217, filed on Jun. 13, 2007, now abandoned which is a continuation of U.S. application Ser. No. 11/123,982, filed on May 6, 2005 now abandoned which is a continuation of U.S. application Ser. No. 09/180,558, filed on Nov. 6, 1998, now U.S. Pat. No. 6,945,457, which is a national stage of PCT/US97/08089 filed May 9, 1997 which claims the benefit of the filing date of U.S. Provisional Patent Application No. 60/017,533 filed May 10, 1996, the disclosures of all of which are hereby incorporated herein by reference.

FIELD OF THE INVENTION

The invention relates to retail terminals for automated transactions and a unique system design therefor.

BACKGROUND OF THE INVENTION

For decades, retail sales and services have been automated to greater or lesser degrees. Historically in many European countries, shopkeepers of bakeries and other purveyors have long provided simple vending machines to dispense their products at their street entrances after business hours. More ambitiously automated restaurants are already legendary in the history of the United States. Other and more recent entrants in the automated retail sales and service industries include automated teller machines (ATMs), custom greeting card kiosks, automated lottery machines and other home and commercial business terminals including various Internet services available via personal computer.

Retail terminal technology generally, however, has been pervaded by a fundamental flaw which itself has gone completely unrecognized. This flaw becomes apparent when one considers the piecemeal character of retail terminals of all types in the applicable prior art. Without any known exception, automated retail functions are provided only to address particular and narrow needs. An ATM may dispense postage stamps, but treats the stamp sheets virtually as an alternate currency in a limited menu of deposit and cash access services. Lottery machines dispense lottery tickets; insurance machines dispense insurance policies; and fancy pay telephones and the most advanced home computers function primarily as old-fashioned credit card order lines for the various products and services available online. In short, even in the most recent instances the only advantage in retail automation has been the same as it has been for many years—the elimination of the human attendant.

A need thus remains for an innovation in the area of automated retail goods and services in which an automated transaction machine does more than merely provide existing goods and services in a simple automated way.

SUMMARY OF THE INVENTION

In order to meet this need, the present invention is an automated retail terminal in which a plurality of goods and/or services is provided in an integrated system. The integrated system generally avoids duplicating hardware or functions in the course of delivering the goods or services offered, so for example in a combination ATM and Internet kiosk the same credit card or smart card reader is used for both the ATM and the Internet kiosk functions, the same control screen activates the ATM functions and the Internet functions, and etc. The overall importance—and the details concerning—the integrated system aspect of the present automated transaction terminal will become more apparent in the foregoing description.

DETAILED DESCRIPTION OF THE INVENTION

The present invention is an automated transaction machine comprising an automated retail terminal which provides a plurality of goods and/or services from an integrated and automated system. Two or more goods and/or services are provided not only in combinations heretofore unavailable, but in an integrated system design in which duplication of effort (and hardware) is largely or completely eliminated.

Figure 1:
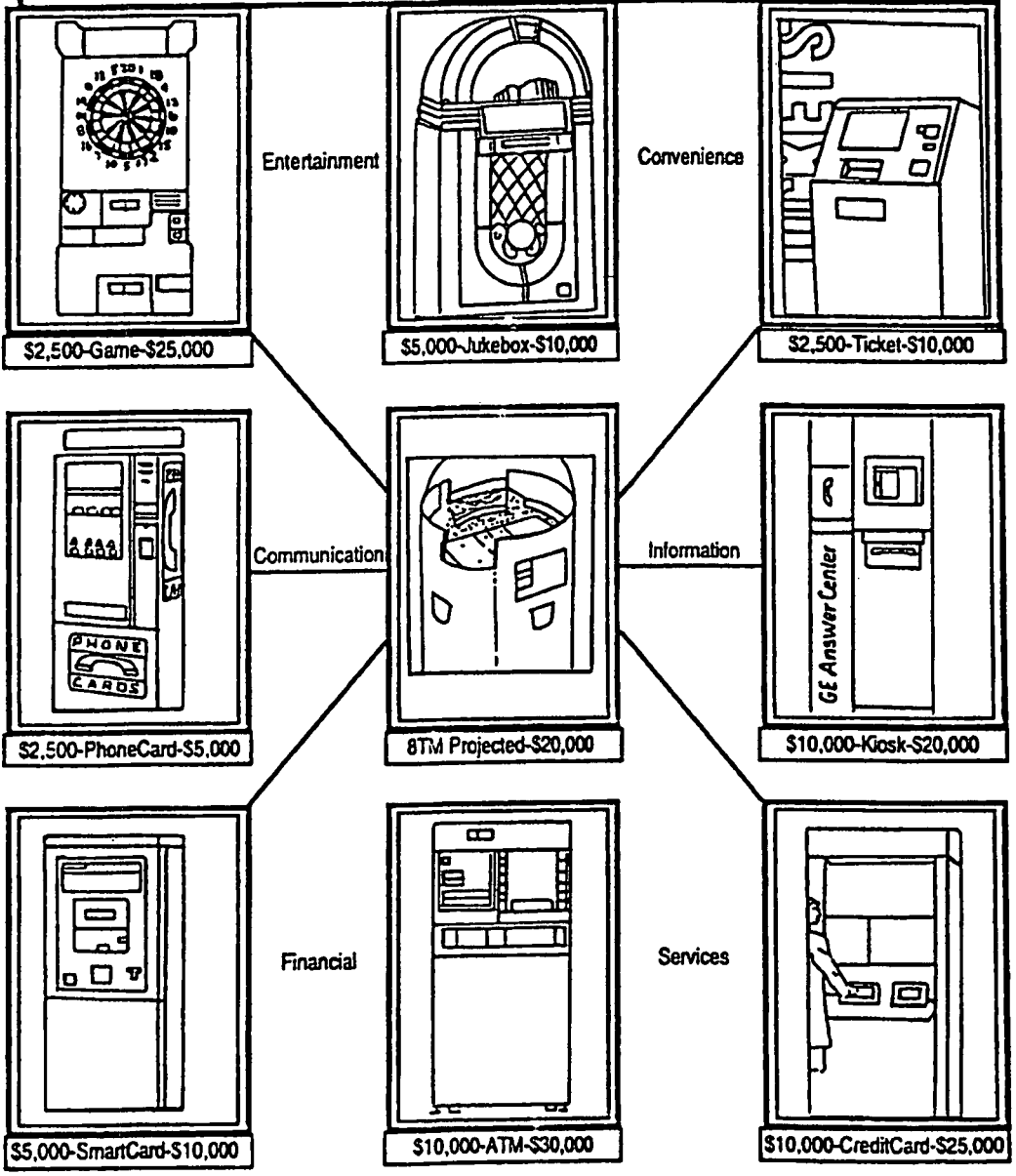
FIG. 1 is a schematic entitled "CONCEPT" which illustrates the various existing goods and services machines which can be combined in accordance with the invention.
Figure 2:
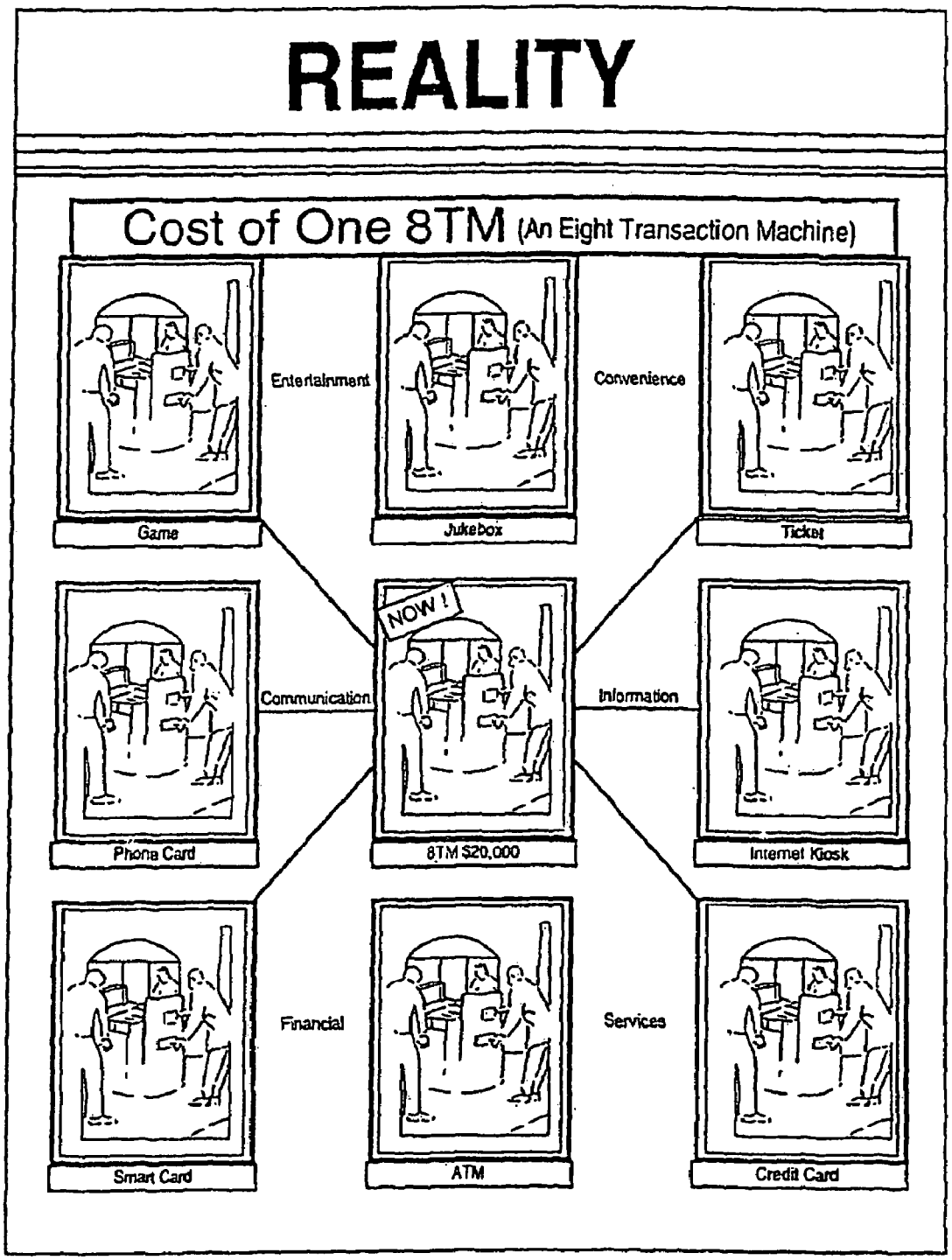
FIG. 2 is a schematic entitled "REALITY" which illustrates the various existing goods and services machines which can be combined in accordance with the present invention.

Referring now to FIGS. 1 and 2, a plurality of machines is shown which can be combined in a single integrated system according to the present invention. However, not all the machines shown need be combined. The invention can be simply the combination of a telephone and a juke box, for example, with the hardware and functions of credit or smart card reading (or encoding), computer hardware and software and audio sound production and reproduction being shared. However, the preferred embodiments of the present invention include an integrated but otherwise traditional ATM, so as to enhance the overall retail sales and services offering by coordinating payment arrangements and generalized banking services with the retail transaction(s). This combination of providing an ATM with other retail goods and services transactions is not only new, but would heretofore have been considered virtually heretical.

The essence of the preferred embodiments of the invention thus resides in the new combination of previously existing but separate means of access to the stream of daily commerce and banking. Meaningful combinations of ATMs and customer retail kiosks have never even been attempted before, possibly because the two technologies have undergone burgeoning technological growth in separately focused directions. For example, certain telephone systems have been promoted as the "ATMs of the future," providing credit card recognition for instant, albeit remote, execution of retail services. Some ATMs dispense both bills and coin change, and offer services such as on-site check cashing with payment of the exact check amount in bills and/or coins. As described above, ATMs in the past have offered limited retail sales options such as the vending of postage stamps via the bill dispenser. But there has not been, heretofore, a meaningful incarnation of a single system, which an individual consumer can use in a single location, wherein real banking services, and real commercial and banking services, have been combined. Because it is difficult to define objectively, however, that which constitutes real or meaningful banking or retail services, the preferred embodiments of the invention are best characterized as providing a retail terminal offering at least two immediately accessible goods or services and selectively dispensing at least two forms of dispensable currency, to emphasize the novel plurality of uniquely combined system means intrinsic to the present invention. The system for providing these multiple services or goods is integrated, moreover; the invention does not comprise the mere freestanding combination of an existing ATM and an existing retail terminal in adjacent proximity.

One of the preferred embodiments of the present invention is that disclosed in U.S. patent application Ser. No. 08/643, 827 entitled "Automated League and Tournament Device." Two goods or services offered are ATM services and game league services, and the two forms of dispensable currency take the form of bills from the bill safe/dispenser and the encodable credit made possible by the smart card encoder therein. Widespread variability is possible with respect to such combinations.

Another embodiment of the invention includes the following components. A free-standing or wall mounted ATM with traditional ATM hardware, software and banking network connections (and including a bill safe, bill dispenser, magnetic stripe card reader, keyboard and video screen) is augmented with additional means as follows. The ATM is fitted with a smart card reader/encoder, so that in addition to the traditional bill dispenser the ATM can dispense encodable currency onto a smart card or its equivalent (a PC card, a removable hard drive, or other means for encoding digital cash or electronic cash of various types.) The video screen is a touchscreen; internal software provides a first screen menu for selection of traditional ATM services and at least two additional immediate access retail services, which are selected from the group consisting of electromechanical games of skill services, smartcard services, insurance services, restaurant services, travel services, sports services, gaming device services, delivery services, coupon services, floral delivery services, gift basket delivery services, introduction services, audio services, news services transportation services, utility services, physician services, school services, security services, building services, credit services, directory services, home services, military services, personal services, automotive services, employment services, recreational services, travelers check services, children's services, video games of skill services, Internet services, brokerage services, government services, entertainment services, library services, catalogue services, print services, diagnostic services, chat services, video services, database services, barter services, engineering services, pharmacy services, identification services, detective services, church services, loan services, training services, buying services, recruitment services, accounting services, photographic services, food services, radio services, credit services, theme park services, music services, financial services, full-line vending services, health care services, remote access services, payment services, computer services, search services, network services, subscription services, virtual reality services, advertising services, rental services, programming services, beverage services, credit/debit card services, freight services, stored value card services, beauty services, tax services, leasing services, medical services, emergency services, publishing services, counseling services, satellite services, screening services, real estate services, telephone services, ticket services, television services, dating services, information services, lottery services, software services, reservation services, communication services, Intranet services, adult services, referral services, repair services, legal services, consulting services, maintenance services, moving services, trade show services, design services, lodging services, mail services, fast food services, automated services, recording services, clothing services, wireless services, human services, and encryption services. For the purpose of this embodiment, the form such second service takes must be an immediately realizable service, with a good or service being generally immediately rendered to the individual using the system (airline or theatre tickets being printed on the spot, for example) or being separately commenced (initiation of a delivery of flowers in a remote city, for example). It is readily apparent that this combination system is quite different from any of prior art ATMs, telephone ATMs "of the future," or even personal computer Internet connections which may provide retail functions but do give access to at least two forms of dispensable currency.

The most preferred embodiments of the present invention include means for providing at least two retail services which are not only immediately, realizable but are also immediately accessible to the individual user. Preferred immediate access services include game of skill services, music (juke box) services, vending, publishing (customized newspapers printed on the spot, for example), dating, smart card encryption, travel and entertainment ticketing, and financial, insurance and brokerage services. The consumer appeal of synthesized commercial and retail services with banking services is enormous, which in itself highlights the irony that these diverse services, and the means for providing them, have never been combined elsewhere heretofore.

User access to systems provided according to the invention will normally be accomplished by credit card, smart card or other identification card, but other means are contemplated as within the scope of the invention. Literally any means of positive identification of any given individual user to the system can be implemented, such as iris or fingerprint scans and matching to user databases. Smart card access itself will undoubtedly continue to evolve as smart cards increase in their accommodation of data and processing speed and ability, and this will only enhance the multiple retail and banking aspects of the preferred embodiments of the invention.

Figure 3A:
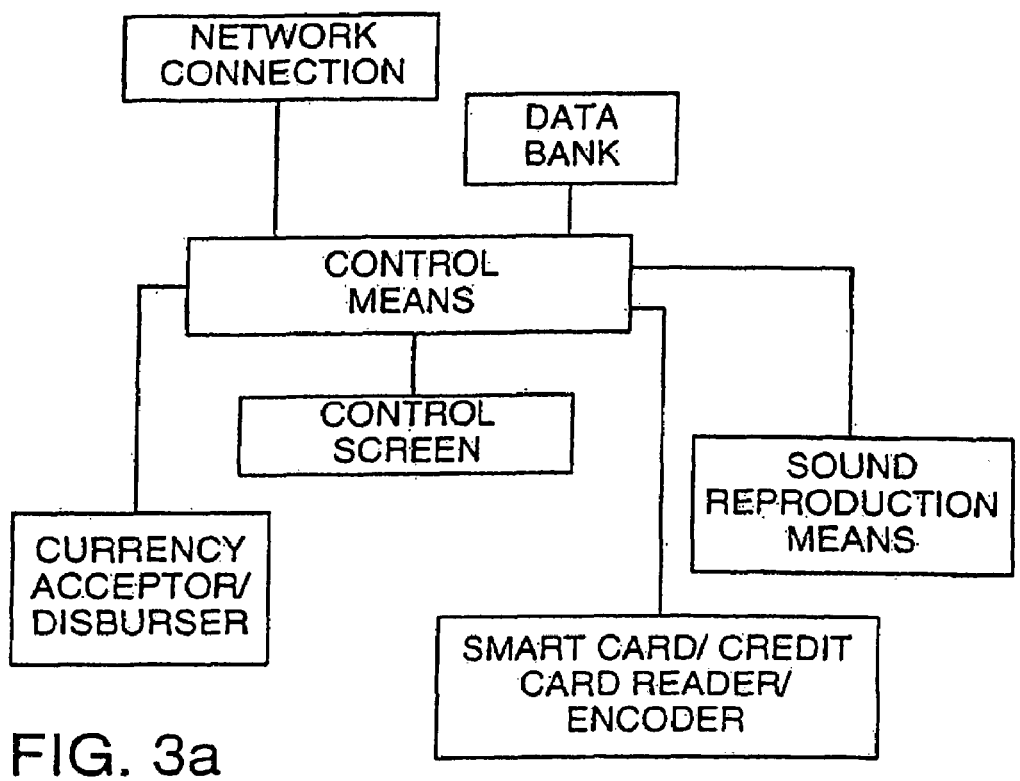
FIGS. 3a-3e are schematics which show various combinations of integrated systems according to the present invention.
Figure 3B:
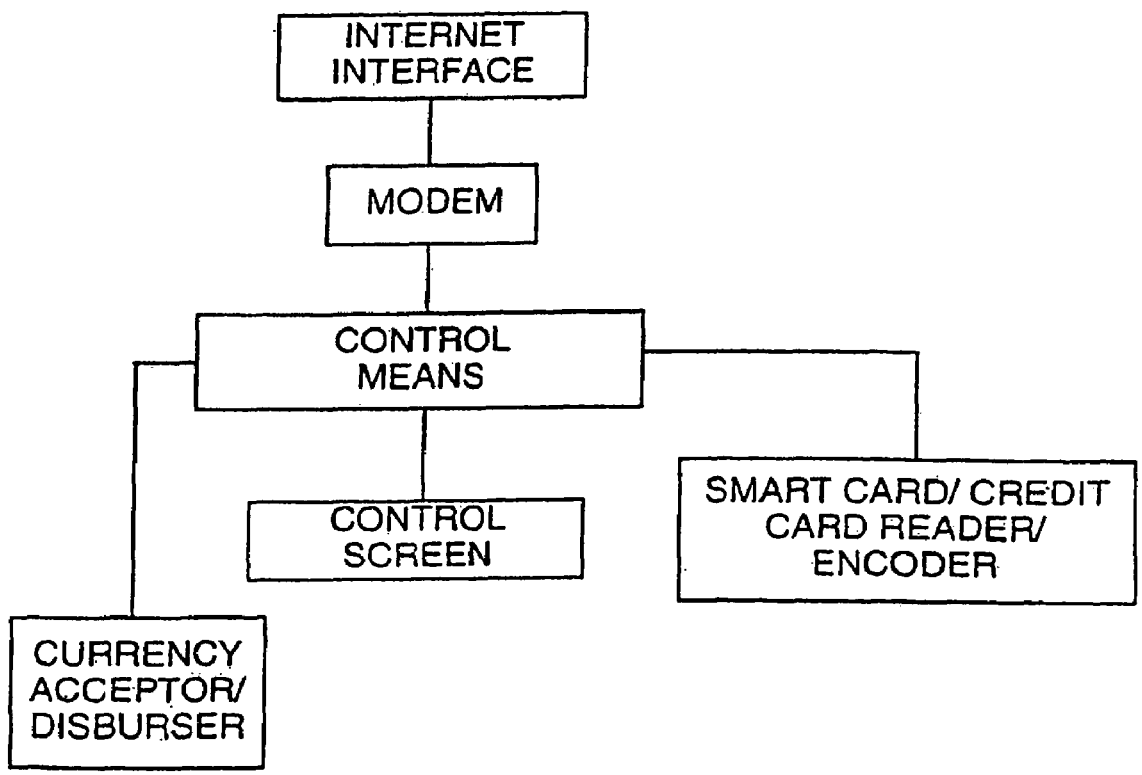
Figure 3C:
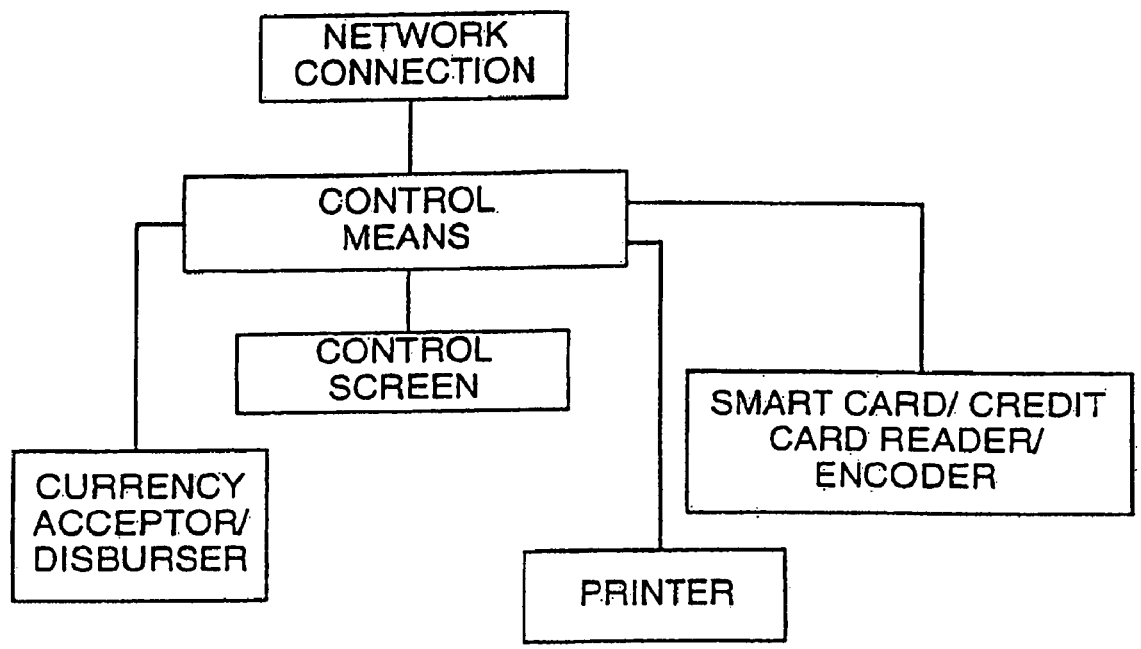
Figure 3D:
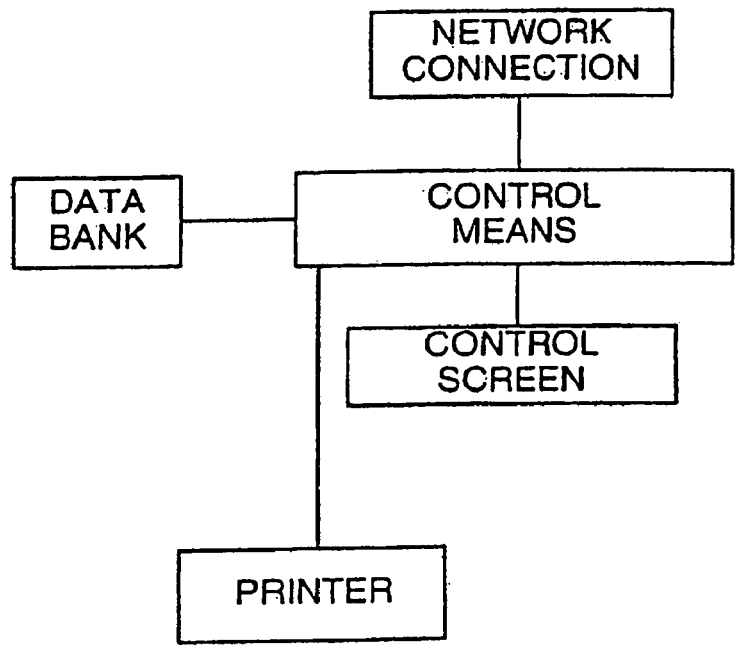
Figure 3E:
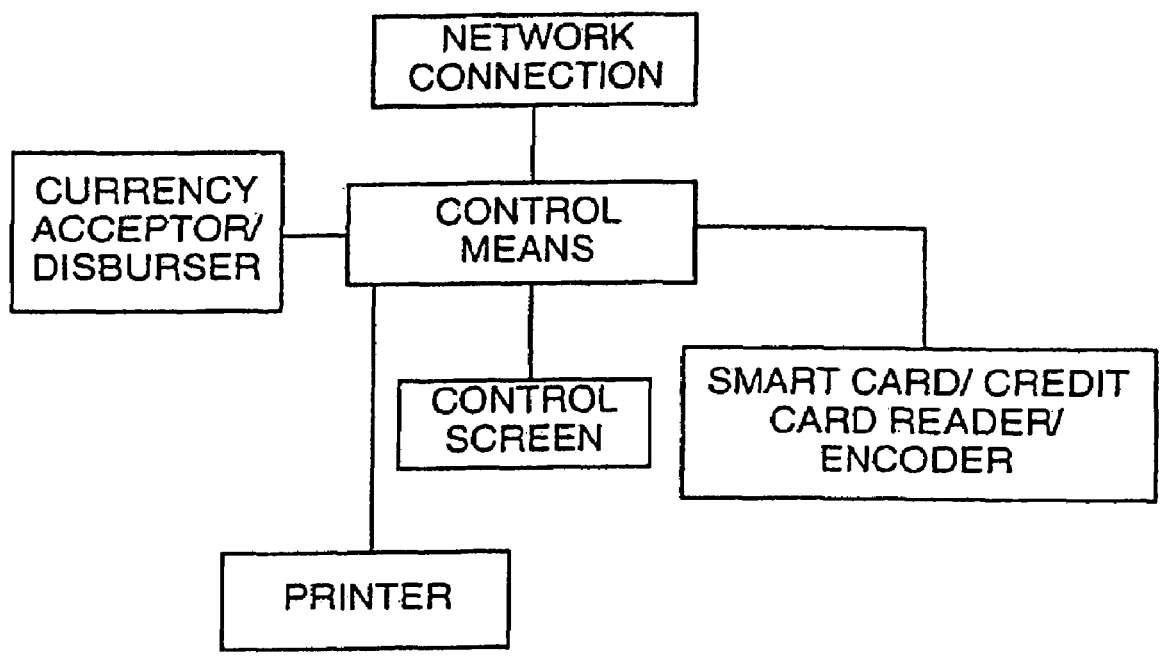

Referring now to FIGS. 3a-3e, five exemplary system combinations are illustrated schematically. FIG. 3a illustrates a combined ATM and juke box system; FIG. 3b illustrates a combined ATM and Internet retail terminal; FIG. 3c shows a combined ATM and insurance policy terminal; FIG. 3d illustrates a combined dating service and travel ticketing terminal; and FIG. 3e illustrates a combined ATM and lottery dispensing machine. These combinations are exemplary of the various conceptual incarnations of the invention as described above.

Figure 4:
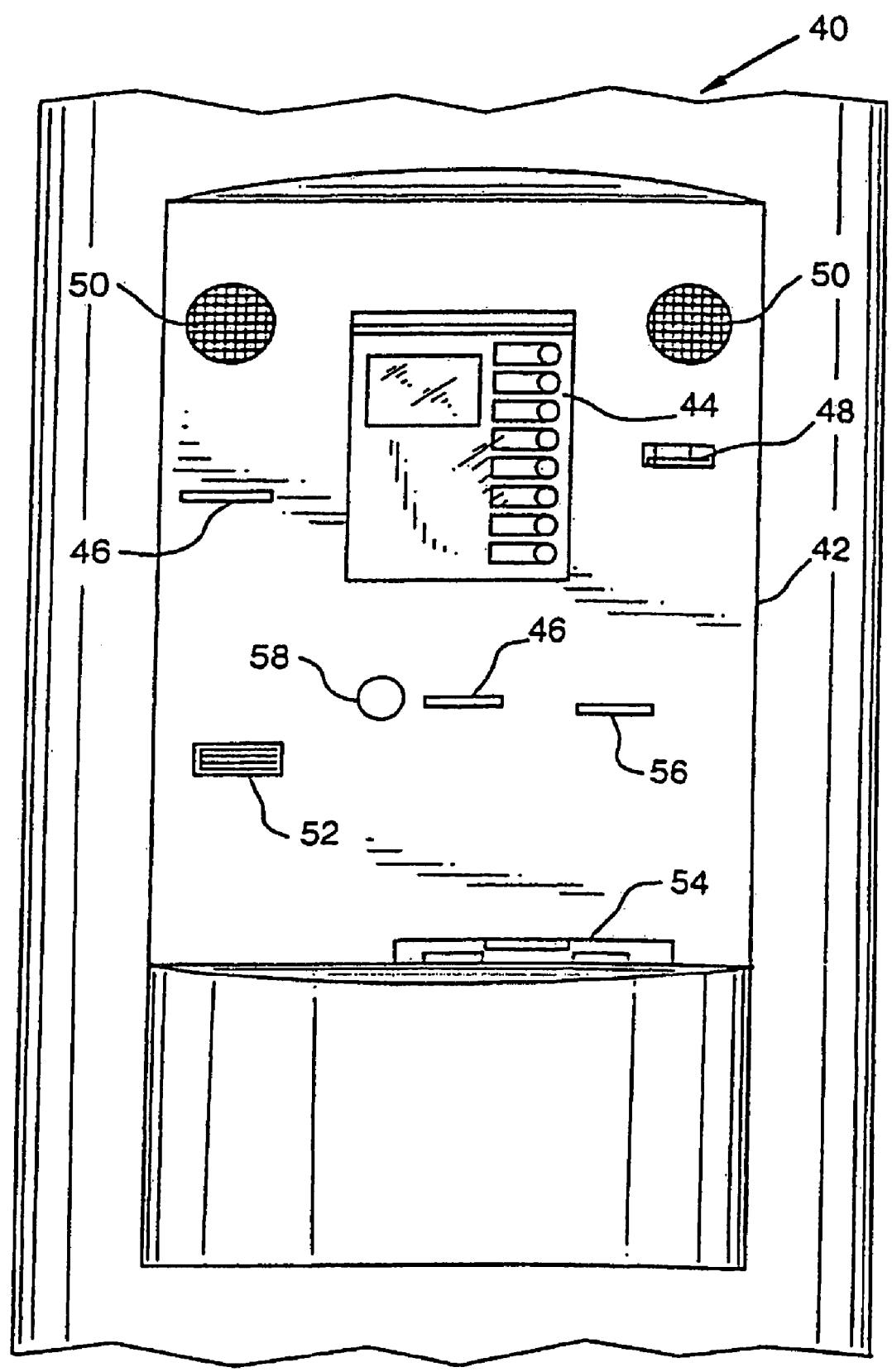
FIG. 4 is a side elevational view of a control panel according to a preferred embodiment of the invention.

Referring now to FIG. 4, the multiple functionalities can be combined via a video touchscreen which provides for selection of a wide variety of goods and/or services. FIG. 4 is a partial side elevational view of a kiosk 40 including a control panel 42 having a video command touchscreen 44, at least one smart card dispenser 46, a credit card reader 48, stereo speakers 50, a bill (cash) acceptor 52, a bill dispenser 54 and a receipt (printer) dispenser 56. Optionally, one of the smart card dispensers 46 may be recording means for encoding information on media other than smart cards, including but not limited to magnetic recording tape; floppy or removable hard disks or drives; recordable CDs, PC cards or PCMCIA cards and etc. A motion/sound/position sensor 58 is also provided adjacent the video command touchscreen. A person using the control panel 42 thus has access to all available goods and/or services in a single location.

Figure 5:
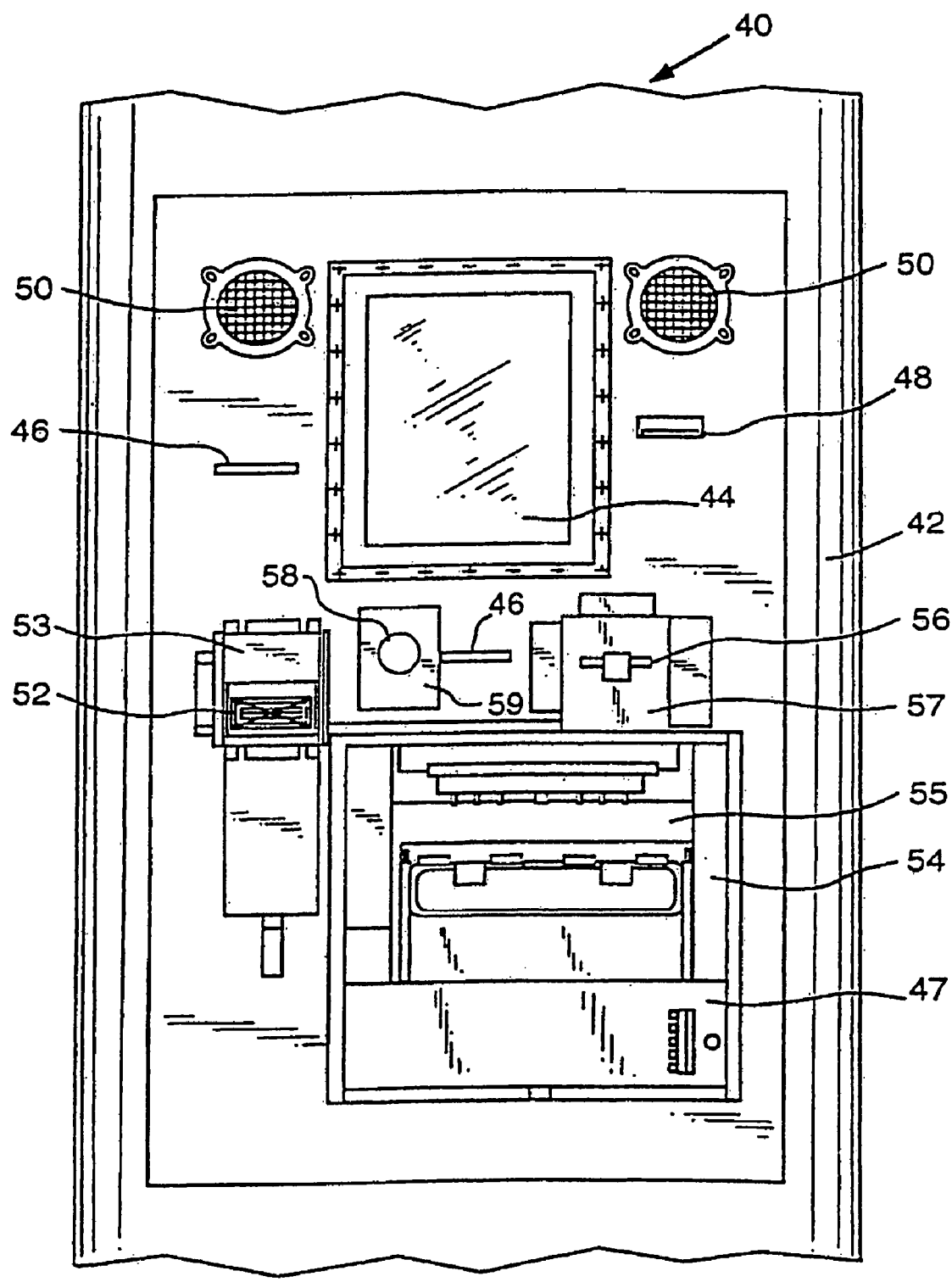
FIG. 5 is a side elevational view of the same mechanics as shown in FIG. 4 but with the control panel removed.

FIG. 5 illustrates the control panel 42 of FIG. 4 with its cover removed, exposing the underlying mechanical features not including the computerized control and optional network access means which drive the system. A bill dispenser security safe 55 is thus positioned surrounding the bill dispenser 54. A bill acceptor mechanism 53 known in the art supports the bill acceptor.

A smart card safe 47 contains smart card inventory to supply to the smart card dispenser(s) 46. A motion/sound/position device 59 supports the sensor 58. A printer 57 provides receipts or other printed materials to the receipt (printer) dispenser 56. Each individual mechanism illustrated in FIGS. 4 and 5 is known in the art, and the invention combines a number of them in a novel and commercially irresistible way.

FIGS. 4 and 5 illustrate a video command touchscreen 44 which is deliberately in portrait rather than landscape orientation. This deliberate orientation enhances the suitability of the command screen to relatively long, single-column selection menus such as those of the World Wide Web on the Internet and also adds an attractive design feature to the kiosk containing it.

Figure 6:
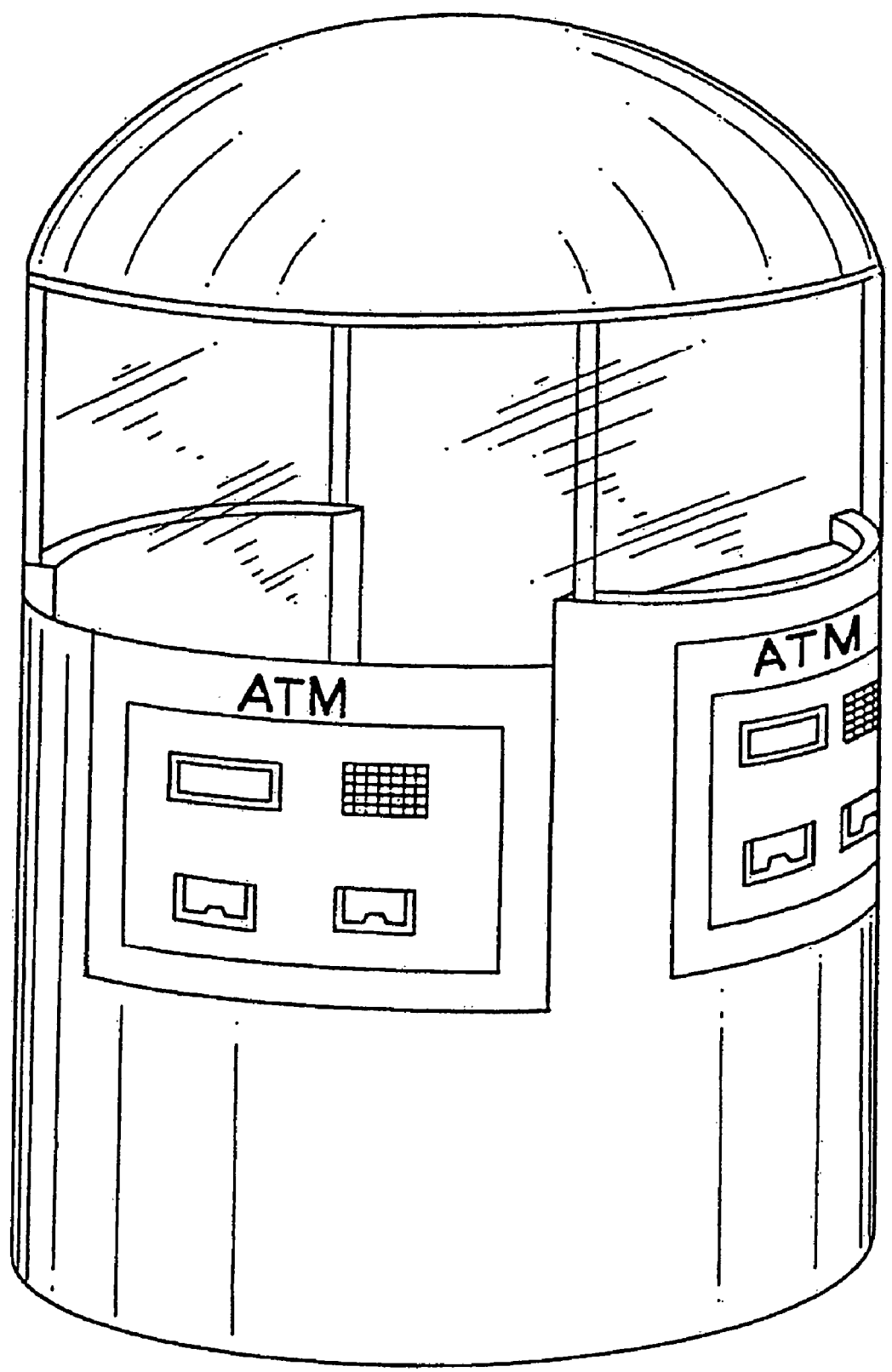
FIG. 6 is a perspective view of a further embodiment of the invention which combines multiple transaction stations in a kiosk, which might house any retail function, such as automobile service and refueling or fast food dispensing or vending.

FIG. 6 illustrates a kiosk containing multiple transaction control panels similar to those of FIG. 4. A kiosk such as shown can house games, automobile refueling or fast food services in automated form, or virtually any other goods or services disclosed herein.

Figure 7A:
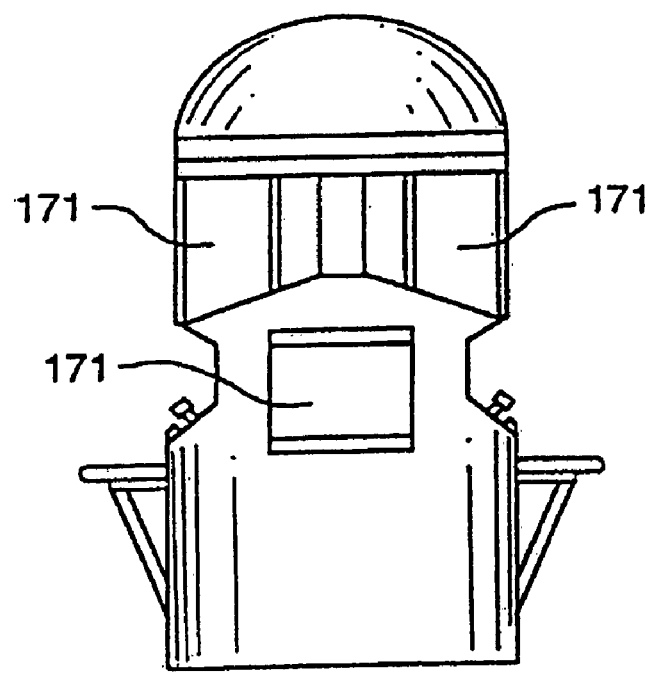
FIGS. 7a and 7b are side elevational views of a yet further embodiment of the invention.
Figure 7B:
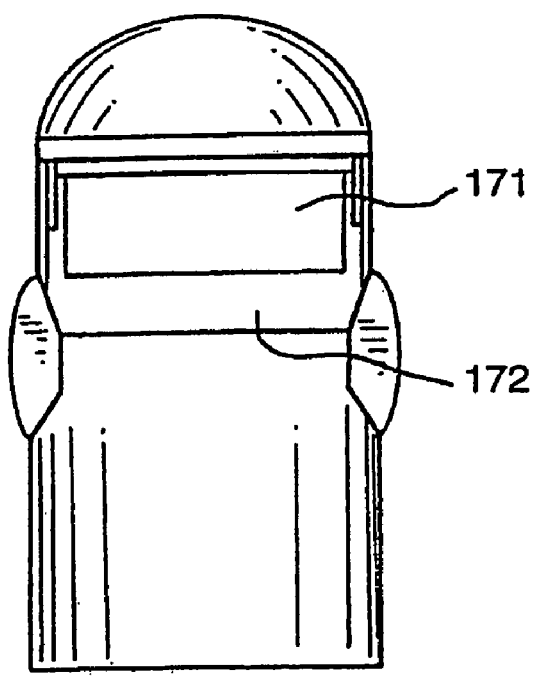

FIGS. 7*a* and 7*b* are side elevational views of a further embodiment of the invention. Segments 171 can house monitors, liquid crystal or gas plasma displays; segment 172 can house three dimensional volumetric displays including electromechanical games or displays or three dimensional video or holographic arrays. Kiosks such as are shown in FIGS. 7*a* and 7*b* may have, optionally, fold down seating and/or modular construction.

The invention is susceptible of widespread departure from the above disclosure without departing from the scope of the invention. Virtually any heretofore uncombined goods and/or services provision may be combined in the automated transaction terminal of the present invention. The key to the invention is the multiple functioning of the terminal as compared to primarily single purpose devices of the prior art. Another way of understanding the most preferred embodiments of the present invention is as an ATM combined with an additional functionality typically found, in the prior art, only in its own freestanding device, i.e., juke box, Internet terminal, etc. Combinations of individual goods and services can be customized to the theme or character of the intended location, and the combinations are thus deliberate, not slapdash.

Notwithstanding the foregoing description, the invention is only to be limited as is set forth in the accompanying claim.

The invention claimed is:

1. An automated retail terminal for use by a consumer to purchase from a banking or commercial ATM provider, cash access services, comprising:
   an automated teller machine;
   an Internet interface to the automated teller machine for providing the user with services for immediately realizing access to dispensable currency;
   a user interface to the automated teller machine;
   means for identifying the user to the automated teller machine;
   network services to the automated teller machine that include encryption services, security services and at least one ATM network connection; and
   means for selectively dispensing at least one form of dispensable currency using the automated teller machine video command or control touchscreen;
   where the consumer may purchase cash access services through the use of the user interface and the ATM network connection, in combination with Intranet services, Internet services or the World Wide Web on the Internet.

2. The automated retail terminal according to claim 1, further comprising system means for accepting cash, checks or removable media deposits.

3. The automated retail terminal according to claim 1, further comprising system means for check cashing by use of coins, cash or encoding services.

4. The automated retail terminal according to claim 1, further comprising system means by use of a magnetic stripe card reader.

5. The automated retail terminal according to claim 1, further comprising system means by use of a magnetic stripe card reader/encoder.

6. The automated retail terminal according to claim 1, further comprising system means by use of a smart card reader/encoder.

7. The automated retail terminal according to claim 1, further comprising system means by use of a magnetic stripe card/smart card reader/encoder.

8. The automated retail terminal according to claim 1, further comprising system means by use of a removable media encoder.

9. The automated retail terminal according to claim 1, further comprising system means by use of a bill acceptor.

10. The automated retail terminal according to claim 1, further comprising system means by use of a coin acceptor.

11. The automated retail terminal according to claim 1, further comprising system means by use of a bill dispenser.

12. The automated retail terminal according to claim 1, further comprising system means by use of a coin dispenser.

13. The automated retail terminal according to claim 1, further comprising system means by use of a currency acceptor/disburser.

14. The automated retail terminal according to claim 1, further comprising system means by use of a security safe.

15. The automated retail terminal according to claim 1, further comprising system means by use of a printer.

16. The automated retail terminal according to claim 1, further comprising system means by use of a telephone.

17. The automated retail terminal according to claim 1, further comprising system means by use of computer controlled hardware and software.

18. The automated retail terminal according to claim 1, further comprising system means by use of a keyboard.

19. The automated retail terminal according to claim 1, further comprising system means by use of a printer/dispenser for receipts or printed material.

20. The automated retail terminal according to claim 1, further comprising system means by use of a video screen for command/control function.

21. The automated retail terminal according to claim 1, further comprising system means by use of a video touchscreen for command/control function.

22. The automated retail terminal according to claim 1, further comprising system means by use of stereo sneakers for audio or sound re/production.

23. The automated retail terminal according to claim 1, further comprising system means by use of a smart card dispenser.

24. The automated retail terminal according to claim 1, further comprising system means by use of a smart card safe for smart card inventory.

25. The automated retail terminal according to claim 1, further comprising system means by use of a sensor.

26. The automated retail terminal according to claim 1, further comprising system means by use of a motion/sound/position device with a sensor.

27. The automated retail terminal according to claim 1, further comprising system means by use of a standard ATM security and/or a portrait camera.

28. The automated retail terminal according to claim 1, further comprising system means by use of a scanner.

29. The automated retail terminal according to claim 1, further comprising system means by use of monitors, liquid crystal or gas plasma displays, 3-D video, volumetric or holographic arrays for displaying goods and/or services.

30. The automated retail terminal according to claim 1, further comprising, system means by use of modular construction or optional fold down seating.

31. The automated retail terminal for use by a consumer to purchase from a banking or commercial ATM provider cash access services according to claim 1, where, the consumer may consummate the purchase by means of the use of cash.

32. The automated retail terminal for use by a consumer to purchase from a banking or commercial ATM provider cash access services according to claim 1, where, the consumer may consummate the purchase by means of the use of bills.

33. The automated retail terminal for use by a consumer to purchase from a banking or commercial ATM provider cash access services according to claim 1, where, the consumer may consummate the purchase by means of the use of coins.

34. The automated retail terminal for use by a consumer to purchase from a banking or commercial ATM provider cash access services according to claim 1, where, the consumer may consummate the purchase by means of the use of currency.

35. The automated retail terminal for use by a consumer to purchase from a banking or commercial ATM provider cash access services according to claim 1, where, the consumer may consummate the purchase by means of the use of encodable currency.

36. The automated retail terminal for use by a consumer to purchase from a banking or commercial ATM provider cash access services according to claim 1, where, the consumer may consummate the purchase by means of the use of digital cash.

37. The automated retail terminal for use by a consumer to purchase from a banking or commercial ATM provider cash access services according to claim 1, where, the consumer may consummate the purchase by means of the use of electronic cash.

38. The automated retail terminal for use by a consumer to purchase from a banking or commercial ATM provider cash access services according to claim 1, where, the consumer may consummate the purchase by means of the use of encodable credit.

39. The automated retail terminal for use by a consumer to purchase from a banking or commercial ATM provider cash access services according to claim 1, where, the consumer may consummate the purchase by means of the use of removable media encoded currency.

40. The automated retail terminal for use by a consumer to purchase from a banking or commercial ATM provider cash access services according to claim 1, where, the consumer may consummate the purchase by means of the use of a smart card.

41. The automated retail terminal for use by a consumer to purchase from a banking or commercial ATM provider cash access services according to claim 1, where, the consumer may consummate the purchase by means of the use of a credit card.

42. The automated retail terminal for use by a consumer to purchase from a banking or commercial ATM provider cash access services according to claim 1, where, the consumer may consummate the purchase by means of the use of a debit card.

43. The automated retail terminal for use by a consumer to purchase from a banking or commercial ATM provider cash access services according to claim 1, where, the consumer may consummate the purchase by means of the use of a stored value card.

44. The automated retail terminal for use by a consumer to purchase from a banking or commercial ATM provider cash access services according to claim 1, where, the consumer may consummate the purchase by means of the use of a phone card.

45. The automated retail terminal for use by a consumer to purchase from a banking or commercial ATM provider cash access services according to claim 1, where, the consumer may consummate the purchase by means of the use of a telephone service.

46. The automated retail terminal for use by a consumer to purchase from a banking or commercial ATM provider cash access services according to claim 1, where, the consumer may consummate the purchase by means of the use of a wireless phone card.

47. The automated retail terminal for use by a consumer to purchase from a banking or commercial ATM provider cash access services according to claim 1, where, the consumer may consummate the purchase by means of the use of a wireless phone service.

48. The automated retail terminal for use by a consumer to purchase from a banking or commercial ATM provider cash access services according to claim 1, where, the consumer may consummate the purchase by means of the use of an identification card.

49. The automated retail terminal for use by a consumer to purchase from a banking or commercial ATM provider cash access services according to claim 1, where, the consumer may consummate the purchase by means of the use of a radio identification card.

50. The automated retail terminal for use by a consumer to purchase from a banking or commercial ATM provider cash access services according to claim 1, where, the consumer may consummate the purchase by means of the use of a check cashing service.

51. The automated retail terminal for use by a consumer to purchase from a banking or commercial ATM provider cash access services according to claim 1, where, the consumer may consummate the purchase by means of the use of an online financial service.

52. The automated retail terminal for use by a consumer to purchase from a banking or commercial ATM provider cash access services according to claim 1, where, the consumer may consummate the purchase by means of the use of an online payment service.

53. The automated retail terminal for use by a consumer to purchase from a banking or commercial ATM provider cash access services according to claim 1, where, the consumer may consummate the purchase by means of the use of an online brokerage service.

54. The automated retail terminal for use by a consumer to purchase from a banking or commercial ATM provider cash access services according to claim 1, where, the consumer may consummate the purchase by means of the use of an online credit service.

55. The automated retail terminal for use by a consumer to purchase from a banking or commercial ATM provider cash access services according to claim 1, where, the consumer may consummate the purchase by means of the use of an online loan service.

56. The automated retail terminal for use by a consumer to purchase from a banking or commercial ATM provider cash access services according to claim 1, where, the consumer may consummate the purchase by means of the use of an online coupon service.

57. The automated retail terminal for use by a consumer to purchase from a banking or commercial ATM provider cash access services according to claim 1, where, the consumer may consummate the purchase by means of the use of an online subscription service.

58. The automated retail terminal for use by a consumer to purchase from a banking or commercial ATM provider cash access services according to claim 1, where, the consumer may consummate the purchase by means of the use of an online advertising service.

59. A method for a consumer to purchase cash access services from a banking or commercial ATM service providers comprising the steps of:

providing automated teller machine access to the consumer by means of an Internet interface to an automated retail terminal;

providing Intranet services to the consumer by the use of an automated retail terminal such that the consumer can purchase a cash access service;

providing Internet services to the consumer by the use of an automated retail terminal such that the consumer can purchase a cash access service;

providing World Wide Web services to the consumer by the use of an automated retail terminal, such that the consumer can purchase a cash access service; and purchasing the cash access services from the ATM service.

60. The method for a consumer to purchase cash access services from an ATM service according to claim 59, further comprising the step of purchasing the cash access service with cash.

61. The method for a consumer to purchase cash access services from an ATM service according to claim 59, further comprising the step of purchasing the cash access service with bills.

62. The method for a consumer to purchase cash access services from an ATM service according to claim 59, further comprising the step of purchasing the cash access service with coins.

63. The method for a consumer to purchase cash access services from an ATM service according to claim 59, further comprising the step of purchasing the cash access service with currency.

64. The method for a consumer to purchase cash access services from an ATM service according to claim 59, further comprising the step of purchasing the cash access service with encodable currency.

65. The method for a consumer to purchase cash access services from an ATM service according to claim 59, further comprising the step of purchasing the cash access service with digital cash.

66. The method for a consumer to purchase cash access services from an ATM service according to claim 59, further comprising the step of purchasing the cash access service with electronic cash.

67. The method for a consumer to purchase cash access services from an ATM service according to claim 59, further comprising the step of purchasing the cash access service with encodable credit.

68. The method for a consumer to purchase cash access services from an ATM service according to claim 59, further comprising the step of purchasing the cash access service with removable media encoded currency.

69. The method for a consumer to purchase cash access services from an ATM service according to claim 59, further comprising the step of purchasing the cash access service with a smart card.

70. The method for a consumer to purchase cash access services from an ATM service according to claim 59, further comprising the step of purchasing the cash access service with a credit card.

71. The method for a consumer to purchase cash access services from an ATM service according to claim 59, further comprising the step of purchasing the cash access service with a debit card.

72. The method for a consumer to purchase cash access services from an ATM service according to claim 59, further comprising the step of purchasing the cash access service with a stored value card.

73. The method for a consumer to purchase cash access services from an ATM service according to claim 59, further comprising the step of purchasing the cash access service with a phone card.

74. The method for a consumer to purchase cash access services from an ATM service according to claim 59, further comprising the step of purchasing the cash access service with a telephone service.

75. The method for a consumer to purchase cash access services from an ATM service according to claim 59, further comprising the step of purchasing the cash access service with wireless phone card.

76. The method for a consumer to purchase cash access services from an ATM service according to claim 59, further comprising the step of purchasing the cash access service with a wireless phone service.

77. The method for a consumer to purchase cash access services from an ATM service according to claim 59, further comprising the step of purchasing the cash access service with an identification card.

78. The method for a consumer to purchase cash access services from an ATM service according to claim 59, further comprising the step of purchasing the cash access service with a radio identification card.

79. The method for a consumer to purchase cash access services from an ATM service according to claim 59, further comprising the step of purchasing the cash access service with a check cashing service.

80. The method for a consumer to purchase cash access services from an ATM service according to claim 59, further comprising the step of purchasing the cash access service with an online financial service.

81. The method for a consumer to purchase cash access services from an ATM service according to claim 59, further comprising the step of purchasing the cash access service with an online payment service.

82. The method for a consumer to purchase cash access services from an ATM service according to claim 59, further comprising the step of purchasing the cash access service with an online brokerage service.

83. The method for a consumer to purchase cash access services from an ATM service according to claim 59, further comprising the step of purchasing the cash access service with an online credit service.

84. The method for a consumer to purchase cash access services from an ATM service according to claim 59, further comprising the step of purchasing the cash access service with an online loan service.

85. The method for a consumer to purchase cash access services from an ATM service according to claim 59, further comprising the step of purchasing the cash access service with an online coupon service.

86. The method for a consumer to purchase cash access services from an ATM service according to claim 59, further comprising the step of purchasing the cash access service with an online subscription service.

87. The method for a consumer to purchase cash access services from an ATM service according to claim 59, further comprising the step of purchasing the cash access service with an online advertising service.

88. Integrated banking and transaction apparatus for use by a consumer, comprising:
- an automated teller machine; and
- means for providing a retail transaction to the consumer through an Internet interface and an Intranet service to the automated teller machine.

* * * * *